(12) United States Patent
Hinoki et al.

(10) Patent No.: US 7,173,806 B2
(45) Date of Patent: Feb. 6, 2007

(54) ELECTRODE FOR ELECTRIC CHEMICAL CAPACITOR, MANUFACTURING METHOD AND APPARATUS THEREOF

(75) Inventors: Kiyonori Hinoki, Tokyo (JP); Kazuo Katai, Tokyo (JP); Yosuke Miyaki, Tokyo (JP); Hideki Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/016,842

(22) Filed: Dec. 21, 2004

(65) Prior Publication Data
US 2005/0201043 A1    Sep. 15, 2005

(30) Foreign Application Priority Data
Dec. 22, 2003   (JP)   ............................ 2003-423969
Dec. 26, 2003   (JP)   ............................ 2003-432272

(51) Int. Cl.
*H01G 9/00*   (2006.01)

(52) U.S. Cl. ....................................... 361/502; 361/503

(58) Field of Classification Search ................ 361/502, 361/508–512, 516, 528–532; 29/25.03; 429/94, 429/211, 219, 231.95, 245
See application file for complete search history.

(56) References Cited

U.S. PATENT DOCUMENTS

| 6,051,038 | A  | * | 4/2000 | Howard et al. | ............ | 29/623.1 |
| 6,236,560 | B1 | * | 5/2001 | Ikeda et al.  | ................. | 361/502 |
| 6,893,772 | B2 | * | 5/2005 | Howard        | ....................... | 429/94 |
| 2003/0014859 | A1 | * | 1/2003 | Kejha et al. | ................ | 29/623.4 |

FOREIGN PATENT DOCUMENTS

| JP | 4-68517      | 3/1992 |
| JP | 2000-12390   | 1/2000 |
| JP | 2000-106332  | 4/2000 |

* cited by examiner

*Primary Examiner*—Eric W. Thomas
(74) *Attorney, Agent, or Firm*—Oblon, Spivak, McClelland, Maier & Neustadt, P.C.

(57) ABSTRACT

An electrode for an electrochemical capacitor includes a sheet-like current collector and a polarizable electrode layer. The polarizable electrode layer is provided on the current collector with a predetermined bare portion left. The polarizable electrode layer has undergone an embossment work and at least part of the bare portion of the current collector has not undergone any embossment work.

5 Claims, 19 Drawing Sheets

ELECTRODE FOR ELECTRIC CHEMICAL CAPACITOR, MANUFACTURING METHOD AND APPARATUS THEREOF

TECHNICAL FIELD

The present invention relates to an electrode for an electrochemical capacitor and a method and an apparatus for the manufacture thereof, and more particularly to an electrode for an electrochemical capacitor having a high volume capacitance and a method and an apparatus for the manufacture thereof.

BACKGROUND ART

Since electrochemical capacitors including an electric double-layer capacitor can be easily made small in size and light in weight, they are expected as, for example, backup power sources for the power sources of portable equipment (small-sized electronic equipment) etc., and auxiliary power sources for an electric automobile and a hybrid vehicle, and various studies have been made for enhancing the performances of the electrochemical capacitors. Especially in a case where a large capacity is required as in the power source for the electric automobile, it has been desired to develop an electrochemical capacitor in which a capacitance per unit volume of electrodes (hereinbelow, termed "volume capacitance") is high.

Each electrode for use in such an electrochemical capacitor has a laminated structure which includes a current collector and a polarizable electrode layer, and it can be fabricated by coating the front surface of the sheet-like current collector with a solution which is to become the material of the polarizable electrode layer, and which is subjected to drying (refer to Patent Document 1). Since, however, the density of the polarizable electrode layer to be formed is low merely by coating the front surface of the current collector with such a solution and then drying the solution, a sufficient volume capacitance cannot be attained. In order to attain a higher volume capacitance, therefore, the polarizable electrode layer needs to be compressed by roll press or the like after the formation thereof by the coating.

[Patent Document 1] JP-A-2000-106332

DISCLOSURE OF THE INVENTION

[Problem that the Invention is to Solve]

The inventors' researches, however, have revealed that the compression of a polarizable electrode layer is insufficient merely by roll press employing a roller whose front surface is substantially smooth, so a volume capacitance (at least 17 F/cm$^3$) which is required of an electrochemical capacitor of high capacitance is difficult of achievement.

Accordingly, an object of the present invention is to provide a manufacturing method and a manufacturing apparatus for an electrode for an electrochemical capacitor having a higher volume capacitance.

Besides, another object of the invention is to provide a manufacturing method and a manufacturing apparatus for an electrode for an electrochemical capacitor having the volume capacitance of at least 17 F/cm$^3$.

[Means for Solving the Problem]

A manufacturing method for an electrode for an electrochemical capacitor according to the present invention is characterized by comprising the first step of forming a polarizable electrode layer on a current collector; the second step of subjecting a front surface of the polarizable electrode layer formed on the current collector, to an embossment work; and the third step of flattening the front surface of the polarizable electrode layer as has undergone the embossment work.

Here, the expression "subjecting the front surface of the polarizable electrode layer to the embossment work" signifies that the polarizable electrode layer is compressed, thereby to form a rugged pattern in the front surface thereof. The rugged pattern to be formed may be either regular or random. Besides, the expression "flattening the front surface of the polarizable electrode layer as has undergone the embossment work" signifies that the height of the rugged pattern formed in the front surface of the polarizable electrode layer is decreased by compression. Accordingly, the embossment need not always be completely removed, but the height of the rugged pattern may decrease. In this case, as long as the height of the rugged pattern is decreased as a whole, a new embossment may well be formed. The "height of the rugged pattern" signifies the perpendicular distance between convex parts and concave parts.

In this manner, in the invention, the front surface of the polarizable electrode layer undergoes the embossment work, so that the polarizable electrode layer is effectively compressed, and it is consequently permitted to achieve a high volume capacitance of at least 17 F/cm$^3$. Moreover, after the embossment work, the resulting embossment is flattened, so that porous grains contained in the polarizable electrode layer are prevented from falling off, and it is permitted to ensure a high reliability.

The first step should favorably be performed by coating the current collector with a coating liquid which contains porous grains having an electronic conductivity, a binder capable of binding up the porous grains, and a liquid capable of dissolving or dispersing the binder therein. According to this measure, it is permitted to easily form the polarizable electrode layer on the current collector. In this case, an electrically conductive assistant should favorably be further contained in the coating liquid. With the electrically conductive assistant, it is permitted to promote the migration of charges between the current collector and the polarizable electrode layer.

The second step should favorably be performed by roll press based on a roller whose front surface is provided with a rugged pattern. According to this measure, it is permitted to reliably subject the front surface of the polarizable electrode layer to the embossment work. In this case, the height of the rugged pattern should favorably be set at 20% through 70% inclusive, of the thickness of the polarizable electrode layer before performing the second step. The reason therefor is that, when the rugged pattern is excessively low, the polarizable electrode layer is not effectively compressed, whereas when the rugged pattern is excessively high, a damage to the current collector becomes heavy.

The third step should favorably be performed by roll press based on a roller whose front surface is substantially smooth. According to this measure, it is permitted to reliably flatten the embossment formed in the front surface of the polarizable electrode layer.

Besides, the third step may well be performed after the second step has been performed a plurality of times, or the third step may well be performed a plurality of times. According to this measure, the polarizable electrode layer is compressed still more, and the porous grains contained in the polarizable electrode layer are more reliably prevented from falling off.

A manufacturing apparatus for an electrode for an electrochemical capacitor according to the invention is a manufacturing apparatus for an electrode for an electrochemical capacitor, for manufacturing the electrode for the electrochemical capacitor by roll-pressing a laminated product in which, at least, a current collector and a polarizable electrode layer are stacked, characterized by comprising a first roll press section which subjects a front surface of the polarizable electrode layer to an embossment work; and a second roll press section which is disposed downstream of the first roll press section, and which flattens the front surface of the polarizable electrode layer as has undergone the embossment work.

With the manufacturing apparatus according to the invention, the polarizable electrode layer can be effectively compressed, and porous grains contained in the polarizable electrode layer can be prevented from falling off, so that a high reliability can be ensured. Besides, the apparatus is prevented from being polluted due to the porous grains which have fallen off.

The first roll press section should preferably include first and second rollers which roll-press the laminated product, and at least one of which is provided with a rugged pattern in its front surface, and the height of the rugged pattern should more preferably be 20% through 70% inclusive, of the thickness of the polarizable electrode layer before performing the roll press based on the first roll press section. Further, it is allowed that the rugged pattern is provided in an area which has substantially the same width as the width of the polarizable electrode layer, and that areas which are adjacent to the first-mentioned area are substantially flat. With such a roller, those parts of the current collector which are not covered with the polarizable electrode layer are subjected to no embossment work, so that a damage to the current collector can be relieved.

The second roll press section should favorably include third and fourth rollers which roll-press the laminated product, and the front surfaces of which are both substantially smooth.

Further, an electrode for an electrochemical capacitor according to the invention is characterized by comprising a sheet-like current collector, and a polarizable electrode layer which is provided on the current collector with a predetermined bare portion left, the polarizable electrode layer having undergone an embossment work, at least part of the bare portion of the current collector not having undergone any embossment work.

In this manner, in the invention, the front surface of the polarizable electrode layer has undergone the embossment work, so that the polarizable electrode layer is effectively compressed, and it is consequently permitted to achieve a high volume capacitance of at least 17 F/cm$^3$. Moreover, at least part of the bare portion of the current collector has not undergone any embossment work, so that a damage to the current collector is relieved, whereby a high reliability can be ensured. In this case, it is favorable that substantially the whole surface of the bare portion of the current collector has not undergone any embossment work.

Porous grains having an electronic conductivity, and a binder capable of binding up the porous grains should preferably be contained in the polarizable electrode layer, and an electrically conductive assistant should more preferably be further contained. With the electrically conductive assistant, it is permitted to promote the migration of charges between the current collector and the polarizable electrode layer.

A manufacturing method for an electrode for an electrochemical capacitor according to the invention is characterized by comprising the first step of coating a current collector with a polarizable electrode layer so that a bare portion may be left at part of the current collector; and the second step of subjecting a front surface of the polarizable electrode layer formed on the current collector, to an embossment work, without subjecting at least part of the bare portion of the current collector, to the embossment work.

According to the invention, the electrode for the electrochemical capacitor having a high volume capacitance of at least 17 F/cm$^3$ can be manufactured owing to the effective compression of the polarizable electrode layer, while the reliability of a manufactured product is heightened by relieving a damage to the current collector. Also in this case, it is favorable that substantially the whole surface of the bare portion of the current collector is not undergone any embossment work.

At the first step, the current collector in a band shape as is conveyed in the lengthwise direction thereof should favorably be coated with the polarizable electrode layer of predetermined width so as to leave the bare portion at, at least, one end part of the current collector in the widthwise direction thereof. According to this measure, the polarizable electrode layer is continuously formed on the current collector, so that a high productivity can be attained.

The first step should favorably be performed by coating the current collector with a coating liquid which contains porous grains having an electronic conductivity, a binder capable of binding up the porous grains, and a liquid capable of dissolving or dispersing the binder therein. According to this measure, it is permitted to easily form the polarizable electrode layer on the current collector. In this case, an electrically conductive assistant should favorably be further contained in the coating liquid. With the electrically conductive assistant, it is permitted as stated above to promote the migration of charges between the current collector and the polarizable electrode layer.

The second step should favorably be performed by roll press based on a roller which is partially provided with a rugged pattern. Besides, at the second step, the front surface of the polarizable electrode layer formed on the current collector may well be subjected to an embossment work so as to leave part of the front surface.

A manufacturing apparatus for an electrode for an electrochemical capacitor according to the invention is a manufacturing apparatus for an electrode for an electrochemical capacitor, for manufacturing the electrode for the electrochemical capacitor by roll-pressing a laminated product in which, at least, a current collector and a polarizable electrode layer are stacked, characterized by comprising a roll press section which serves to subject a front surface of the polarizable electrode layer to an embossment work, and which includes a roller that is partially provided with a rugged pattern.

With the manufacturing apparatus for the electrode for the electrochemical capacitor according to the invention, the electrode for the electrochemical capacitor having a high volume capacitance of at least 17 F/cm$^3$ can be manufactured owing to the effective compression of the polarizable electrode layer, while the reliability of a manufactured product is heightened by relieving a damage to the current collector. Also in this case, it is favorable that the rugged pattern is provided in an area which has substantially the same width as the width of the polarizable electrode layer, and that areas which are adjacent to the first-mentioned area are substantially flat.

[Advantages of the Invention]

In this manner, according to the present invention, the front surface of a polarizable electrode layer has undergone an embossment work, so that the polarizable electrode layer is effectively compressed, and it is consequently permitted to achieve a high volume capacitance of at least 17 F/cm$^3$. Moreover, after the embossment work, the resulting embossment is flattened, so that porous grains contained in the polarizable electrode layer are prevented from falling off, and it is permitted to ensure a high reliability. Thus, it is permitted to fabricate an electrochemical capacitor of high capacitance and high reliability.

Further, according to the present invention, the front surface of a polarizable electrode layer has undergone an embossment work, so that the polarizable electrode layer is effectively compressed, and it is consequently permitted to achieve a high volume capacitance of at least 17 F/cm$^3$. Furthermore, at least part of the bare portion of the current collector has not undergone any embossment work, so that a damage to the current collector attributed to the embossment work is relieved, and during manufacture, winding round a roller for roll press can be relived to enhance a job efficiency.

BEST MODE FOR CARRYING OUT THE INVENTION

Now, preferred embodiments of the present invention will be described in detail with reference to the accompanying drawings. In the ensuing description, the construction of an electrode for an electrochemical capacitor as is fabricated by a manufacturing method according to each of the embodiments will be first described, and the manufacturing method according to the embodiment will be thereafter described in detail.

First Embodiment

FIGS. 1(a) and (b) are a schematic sectional view and a schematic perspective view showing the structure of an electrode for an electrochemical capacitor as is fabricated by a manufacturing method according to the preferred embodiment of the present invention, respectively.

Figure 1:
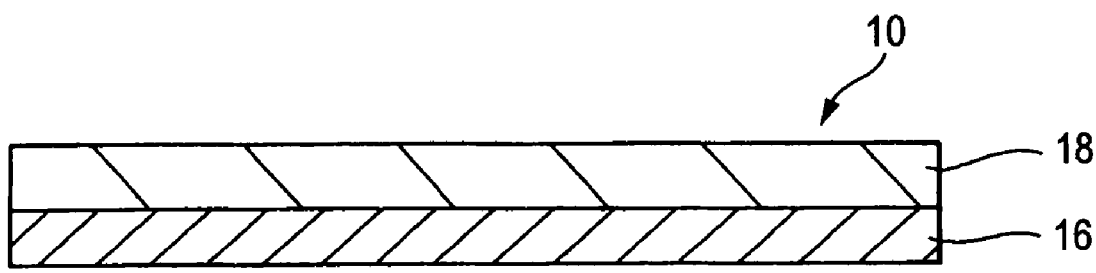
FIG. 1 is a view showing the structure of an electrode for an electrochemical capacitor as is fabricated by a manufacturing method according to a preferred embodiment of the present invention, wherein (a) is a schematic sectional view, and (b) is a schematic perspective view.
Figure 1:
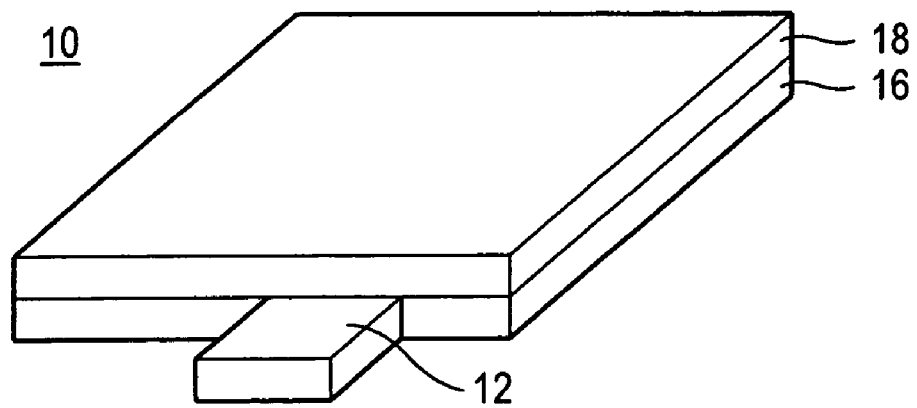

As shown in FIG. 1, the electrode 10 for the electrochemical capacitor according to the embodiment is constructed of a current collector 16 which has an electronic conductivity, and a polarizable electrode layer 18 which has an electronic conductivity and which is formed on the current collector 16.

The material of the current collector 16 is not especially restricted as long as it is a good conductor of electricity capable of causing sufficient charges to migrate into the polarizable electrode layer 18, and it is possible to employ a current collector material for use in a known electrode for an electrochemical capacitor, for example, aluminum (Al). The thickness of the current collector 16 is not especially restricted, either, but in order to make the electrochemical capacitor smaller in size, the current collector 16 should favorably be set at the smallest possible thickness as long as a satisfactory mechanical strength is ensured. Concretely, in the case where aluminum (Al) is employed as the material of the current collector 16, the thickness thereof should preferably be set at 20 µm through 50 µm inclusive, and more preferably at 20 µm through 30 µm inclusive. When the thickness of the current collector 16 made of aluminum (Al) is set within the range, it is permitted to achieve reduction in the size of the electrochemical capacitor with the satisfactory mechanical strength ensured.

Besides, the current collector 16 includes a bare portion 12 which is not covered with the polarizable electrode layer 18, and which is employed as a lead-out electrode.

The polarizable electrode layer 18 is the layer which is formed on the current collector 16, and which contributes to the accumulation and release of charges. As its constituent materials, the polarizable electrode layer 18 contains at least, porous grains which have an electronic conductivity, and a binder which can bind up the porous grains. Although not especially restricted, the content of the porous grains in the polarizable electrode layer 18 should favorably be 84–92 mass-% based on the total quantity of the polarizable electrode layer 18, and that of the binder should favorably be 6.5–16 mass-% based on the total quantity of the polarizable electrode layer 18. In particular, the polarizable electrode layer 18 should favorably consist of 84–92 mass-% of porous grains, 6.5–16 mass-% of binder, and 0–1.5 mass-% of electrically conductive assistant having an electronic conductivity, on the basis of its total quantity.

The porous grains contained in the polarizable electrode layer 18 are not especially restricted as long as they have the electronic conductivity and contribute to the accumulation and release of charges. Mentioned as the material of the porous grains is, for example, granular or fibrous active carbon subjected to an activation process. Usable as such an active carbon is phenolic active carbon, coconut-husk active carbon, or the like. The mean grain diameter of the porous grains should favorably be 3–20 µm, and the BET specific surface area thereof as is calculated from a nitrogen adsorption isotherm by a BET isothermic adsorption formula should preferably be at least 1500 $m^2/g$, more preferably 2000–2500 $m^2/g$. With such porous grains, it is permitted to attain a high volume capacitance.

Besides, the binder contained in the polarizable electrode layer 18 is not especially restricted as long as it is capable of binding up the porous grains. Usable as the binder is any of, for example, polytetrafluoroethylene (PTFE), polyvinylidene fluoride (PVDF), polyethylene (PE), polypropylene (PP), and fluorine rubber. Among them, the fluorine rubber is especially favorably used. The reason therefor is that, when the fluorine rubber is used, the porous grains can be sufficiently bound up even with a small content, whereby the coating film strength of the polarizable electrode layer 18 is enhanced, and the size of a double-layer interface can be enlarged to enhance the volume capacitance.

Mentioned as the fluorine rubber are, for example, vinylidene fluoride-hexafluoropropylene type fluorine rubber (VDF-HFP type fluorine rubber), vinylidene fluoride-hexafluoropropylene-tetrafluoroethylene type fluorine rubber (VDF-HFP-TFE type fluorine rubber), vinylidene fluoride-pentafluoropropylene type fluorine rubber (VDF-PFP type fluorine rubber), vinylidene fluoride-pentafluoropropylene-tetrafluoroethylene type fluorine rubber (VDF-PFP-TFE type fluorine rubber), vinylidene fluoride-perfluoromethylvinyl ether-tetrafluoroethylene type fluorine rubber (VDF-PFMVE-TFE type fluorine rubber, and vinylidene fluoride-chlorotrifluoroethylene type fluorine rubber (VDF-CTFE type fluorine rubber). Herein, the fluorine rubbers in each of which at least two members selected from the group consisting of the substances VDF, HFP and TFE are copolymerized are preferable, and the VDF-HFP-TFE type fluorine rubber in which the three substances of the group are copolymerized is especially preferable because it has the tendency of more enhancing an adhering property and tolerances to chemicals.

Further, the electrically conductive assistant which is contained in the polarizable electrode layer 18 as may be needed is not especially restricted as long as it has the electronic conductivity capable of sufficiently carrying out the migration of charges between the current collector 16 and the polarizable electrode layer 18. Carbon black, for example, is mentioned as the electrically conductive assistant.

Acetylene black, ketffen black, and furnace black, for example, are mentioned as the carbon black, and the acetylene black is favorably employed in the invention. The mean grain diameter of the carbon black should preferably be 25–50 nm, and the BET specific surface area thereof should preferably be at least 50 $m^2/g$, more preferably 50–140 $m^2/g$.

Besides, from the viewpoint of making the electrode 10 for the electrochemical capacitor small in size and light in weight, the thickness of the polarizable electrode layer 18 should preferably be 50–200 µm, more preferably 80–150 µm. By the way, in a case where the thickness of the polarizable electrode layer 18 is not uniform (in a case, for example, where an embossment remains on the surface thereof), the above thickness shall signify the maximum thickness. The electrochemical capacitor can be made small in size and light in weight by setting the thickness of the polarizable electrode layer 18 within the above range.

The thickness (maximum thickness) of the whole electrode 10 for the electrochemical capacitor as is constructed by stacking the current collector 16 and the polarizable electrode layer 18 should preferably be 70–250 µm, and it should more preferably be 100–180 µm. Owing to such a thickness, the electrochemical capacitor can be made small in size and light in weight.

The above is the construction of the electrode 10 for the electrochemical capacitor as is fabricated by the manufacturing method according to the preferred embodiment of the invention. Next, the manufacturing method according to the preferred embodiment of the invention will be described in detail.

Figure 2:
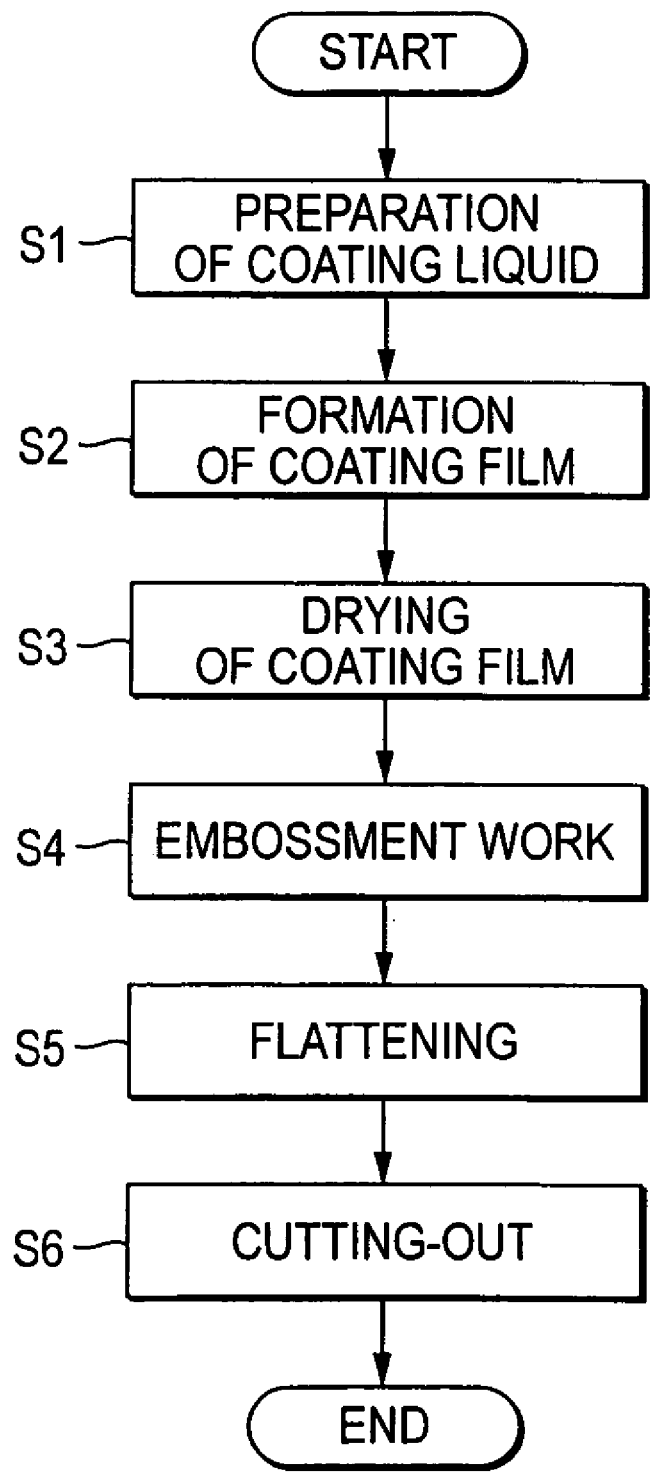
FIG. 2 is a flow chart for explaining the manufacturing method for the electrode for the electrochemical capacitor according to the preferred embodiment of the invention.

FIG. 2 is a flow chart for explaining the manufacturing method for the electrode for the electrochemical capacitor according to the preferred embodiment of the invention. Now, the manufacturing method for the electrode for the electrochemical capacitor according to this embodiment will be described with reference to the flow chart.

Figure 3:
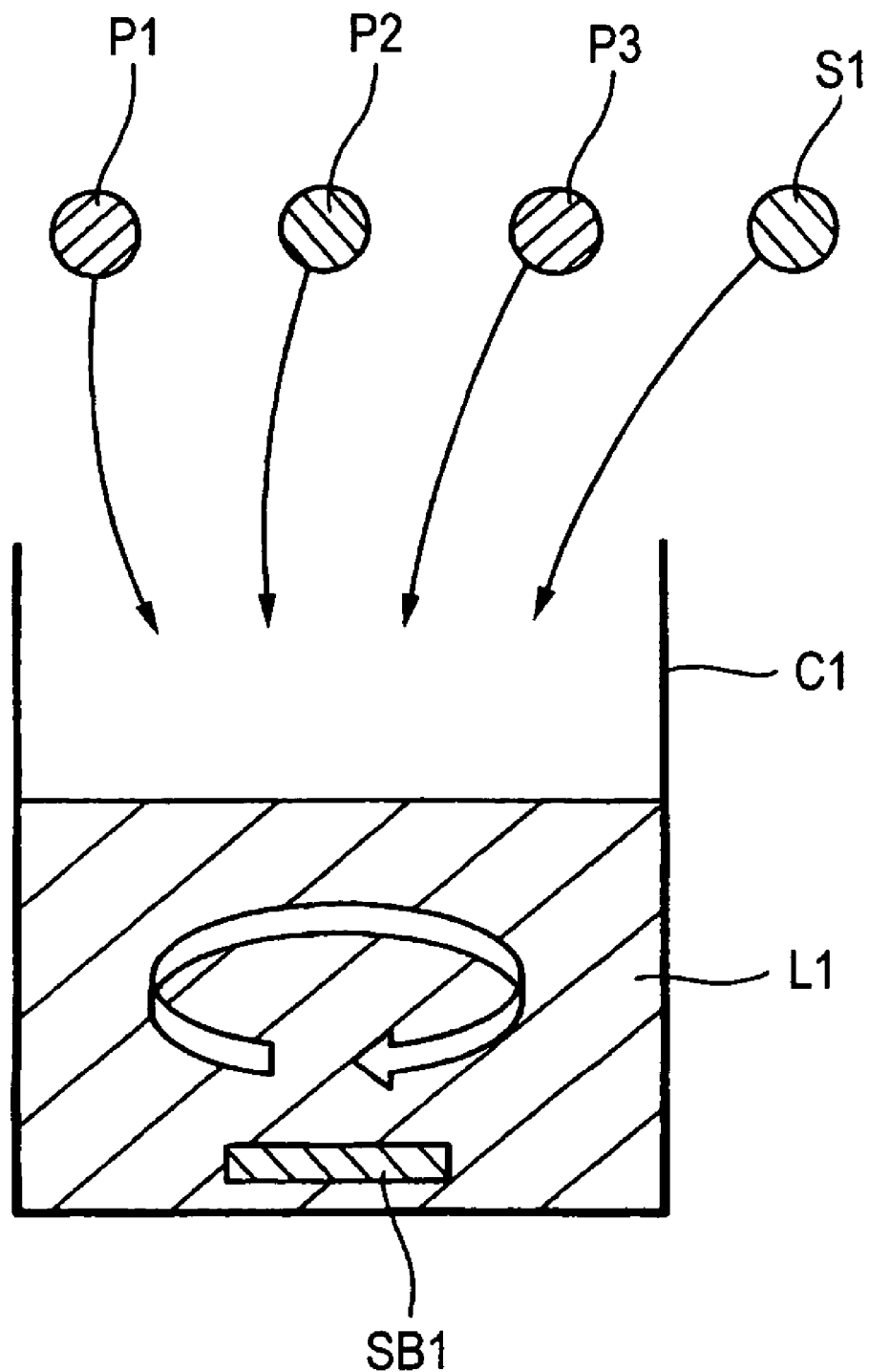
FIG. 3 is a model view for explaining a preparing method for a coating liquid (step S1).

First of all, a coating liquid to become the material of the polarizable electrode layer 18 is prepared (step S1). The preparation of the coating liquid can be performed in the ensuing way. First, as shown in FIG. 3, the porous grains P1 stated above, the binder P2 stated above, a liquid S1 to be stated below, and if necessary, the electrically conductive assistant P3 stated above are thrown into a mixing device C1 including an agitation unit SB1, and they are agitated therein. Thus, the coating liquid L1 can be prepared. The preparation of the coating liquid should favorably include a kneading operation and/or a dilution mixing operation. Here, the "kneading" signifies to blend the constituent materials by agitating them in a state where the liquid has a comparatively high viscosity, while the "dilution mixing" signifies to mix the constituent materials together in a state where a solvent or the like is further added into the kneaded liquid so as to establish a comparatively low viscosity. The time periods of the operations and temperatures during the operations are not especially restricted, but from the viewpoint of establishing a uniform dispersion state, it is favorable to set the kneading time period on the order of 30 minutes-2 hours and the temperature during the kneading on the order of 40–80° C., and it is favorable to set the dilution-mixing time period on the order of 1–5 hours and the temperature during the dilution mixing on the order of 20–50° C.

The liquid S1 shown in FIG. 3 is not especially restricted as long as it is capable of dissolving or dispersing the binder P2 therein. By way of example, a ketonic solvent such as methyl-ethyl-ketone (MEK) or methyl-isobutyl-ketone (MIBK) can be employed as the liquid S1. Besides, the compounding proportion of the liquid S1 in the coating liquid L1 should favorably be set at 200–400 mass-parts based on 100 mass-parts of the whole solid matter in the coating liquid L1. The content of the porous grains P1 in the coating liquid L1 should favorably be set so that the content of the porous grains P1 after the formation of the polarizable electrode layer 18 may fall within the range specified before.

After the coating liquid L1 has been prepared in this way, the surface of the current collector 16 is subsequently coated with the coating liquid L1, thereby to form a coating film (step S2), and the liquid S1 contained in the coating film is removed by drying (step S3). Thus, a state is established where the polarizable electrode layer 18 not compressed yet has been formed on the current collector 16. Any of various known coating methods can be used without any special restriction, as a method for coating the surface of the current collector 16 with the coating liquid L1. It is possible to adopt a method, for example, extrusion lamination, doctor blade coating, gravure coating, reverse coating, applicator coating, or screen printing. Besides, the drying of the coating film can be performed by heating for a predetermined time period. Concretely, the drying should favorably be performed under conditions of 70–130° C. and 0.1–10 minutes.

After the uncompressed polarizable electrode layer 18 has been formed on the current collector 16 in this way, the front surface of the polarizable electrode layer 18 is subsequently embossed (step S4), and the embossed front surface of the polarizable electrode layer 18 is further flattened (step S5). Here, the embossment work of the front surface of the polarizable electrode layer 18 is done for effectively compressing the polarizable electrode layer 18, thereby to heighten a volume capacitance. On the other hand, the flattening of the embossed front surface of the polarizable electrode layer 18 is done for preventing the porous grains P1 from falling off from the embossed front surface of the polarizable electrode layer 18. More specifically, when the front surface is strongly embossed (in a case, for example, where the height of a rugged pattern to be stated later is large), the porous grains P1 are liable to fall off, and hence, it is apprehended to degrade the reliability of a product or to pollute a manufacturing apparatus.

A method for embossing the front surface of the polarizable electrode layer 18 can be incarnated in such a way, for example, that a roller or the like transfer member whose front surface is provided with the rugged pattern is pressed against the front surface of the polarizable electrode layer 18. In this case, the height of the rugged pattern provided in the front surface of the transfer member should preferably be set at 20%–70% inclusive, of the thickness of the polarizable electrode layer 18 before the embossment work, and it should more preferably be set at 30%–60% inclusive. The reason therefor is that, when the height of the rugged pattern is excessively small, the polarizable electrode layer 18 is not effectively compressed, whereas when the height of the rugged pattern is excessively large, a damage to be done to the current collector 16 becomes heavy. Incidentally, the "height of the rugged pattern" signifies the perpendicular distance between a convex part and a concave part.

Besides, a method for flattening the embossed front surface of the polarizable electrode layer 18 can be incarnated in such a way, for example, that a roller or the like flattening member whose surface is substantially smooth is pressed against the front surface of the polarizable electrode layer 18.

Owing to the above operations, the polarizable electrode layer 18 which has been effectively compressed and which prevents the porous grains from falling off is formed on the current collector 16. Accordingly, when the resulting structure is cut out into a size and a shape which are necessary (step S6), the electrode 10 for the electrochemical capacitor is finished up.

Figure 4:
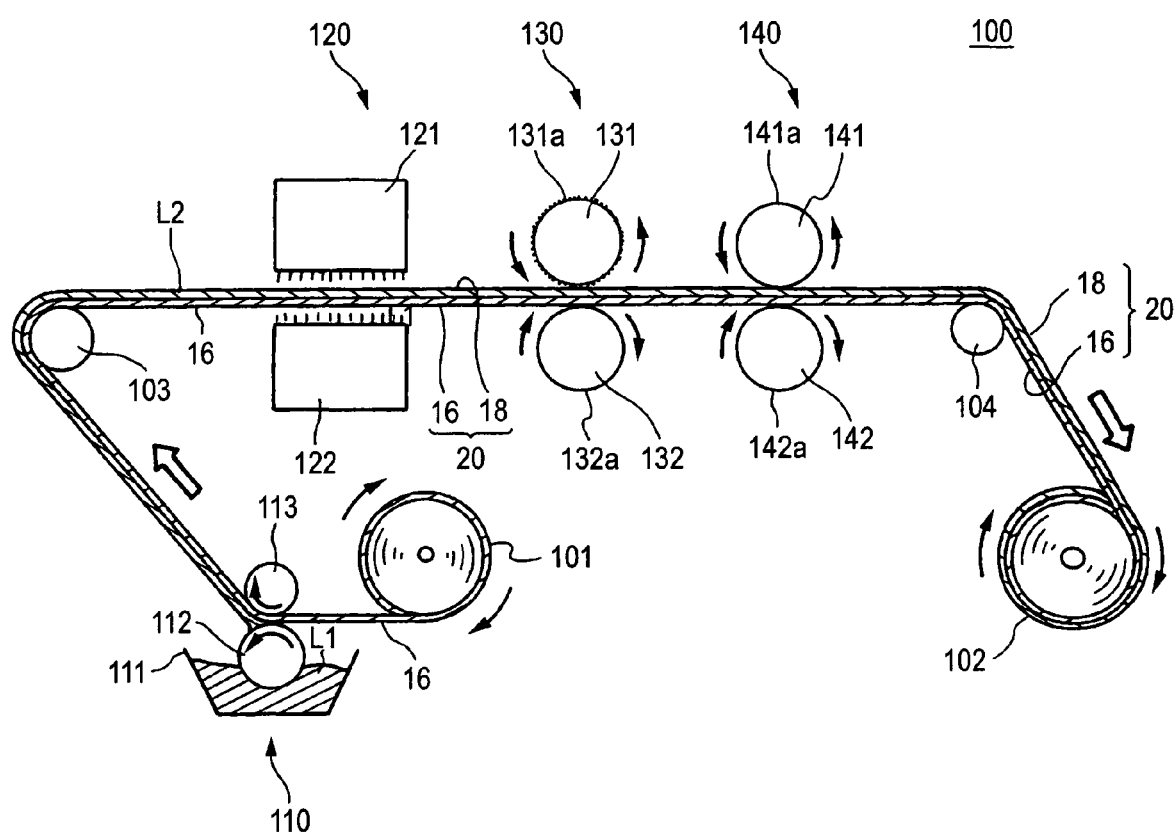
FIG. 4 is a schematic view showing the structure of a manufacturing apparatus for the electrode for the electrochemical capacitor according to a preferred embodiment of the invention.

FIG. 4 is a schematic view showing the structure of an apparatus which is capable of performing the above steps S2–S5 (the manufacturing apparatus for the electrode for the electrochemical capacitor).

The manufacturing apparatus 100 for the electrode for the electrochemical capacitor as shown in FIG. 4 includes a feed roll 101 round which a sheet-like current collector 16 is wound, a take-up roll 102 round which a laminated product 20 consisting of the current collector 16 and a polarizable electrode layer 18 is to be wound by rotating at a predetermined velocity, and a coating section 110, a drying section 120, a first roll press section 130 and a second roll press section 140 which are disposed between the feed roll 101 and the take-up roll 102 in the order mentioned. In this manner, the manufacturing apparatus 100 for the electrode for the electrochemical capacitor has the construction in which the coating section 110, drying section 120, first roll press section 130 and second roll press section 140 are successively arranged from the upper stream (feed roll 101) to the lower stream (take-up roll 102).

The coating section 110 is a portion for performing the process (step S2) for coating the surface of the current collector 16 with a coating liquid L1. The coating section 110 includes a vessel 111 which reserves the coating liquid L1 therein, a coating-liquid feed roll (gravure roll) 112 which feeds the current collector 16 with the coating liquid L1 in the vessel 111, and a backup roll 113 which rotates in interlocking with the coating-liquid feed roll 112. As shown in FIG. 4, the current collector 16 fed from the feed roll 101 is conveyed in a state where it is held between the coating-liquid feed roll 112 and the backup roll 113 which are rotating, whereby a coating film L2 serving as the material of the polarizable electrode layer 18 is formed on one surface of the current collector 16. The current collector 16 formed with the coating film L2 is moved toward the drying section 120 by a guide roll 103.

The drying section 120 is a portion for performing the process (step S3) for removing a liquid S1 which is contained in the coating film L2. In the manufacturing apparatus 100 for the electrode for the electrochemical capacitor as shown in FIG. 4, the drying section 120 is constituted by two dryers 121 and 122 which are arranged so as to hold the current collector 16 therebetween, and the liquid S1 contained in the coating film L2 is removed by heating based on the dryers 121 and 122, until the coating film L2 becomes the polarizable electrode layer 18. Thus, a state is established where the polarizable electrode layer 18 has been formed on the surface of the current collector 16. However, the density of the polarizable electrode layer 18 is low in this state, and a high volume capacitance cannot be attained in the state left intact.

The first roll press section 130 is a portion for performing the process (step S4) for embossing the front surface of the polarizable electrode layer 18. In the manufacturing apparatus 100 for the electrode for the electrochemical capacitor as shown in FIG. 4, the first roll press section 130 includes a first roller 131 arranged on the side of the polarizable electrode layer 18, and a second roller 132 arranged on the side of the current collector 16, and the laminated product 20 is roll-pressed by the rollers 131 and 132, thereby to compress the polarizable electrode layer 18 included in the laminated product 20. Here, the front surface 131a of the first roller 131 is provided with a rugged pattern, whereby the rugged pattern is transferred onto the front surface of the polarizable electrode layer 18 having passed through the first roll press section 130. That is, the front surface of the polarizable electrode layer 18 is embossed. On the other hand, the front surface 132a of the second roller 132 is substantially smooth.

Figure 5:
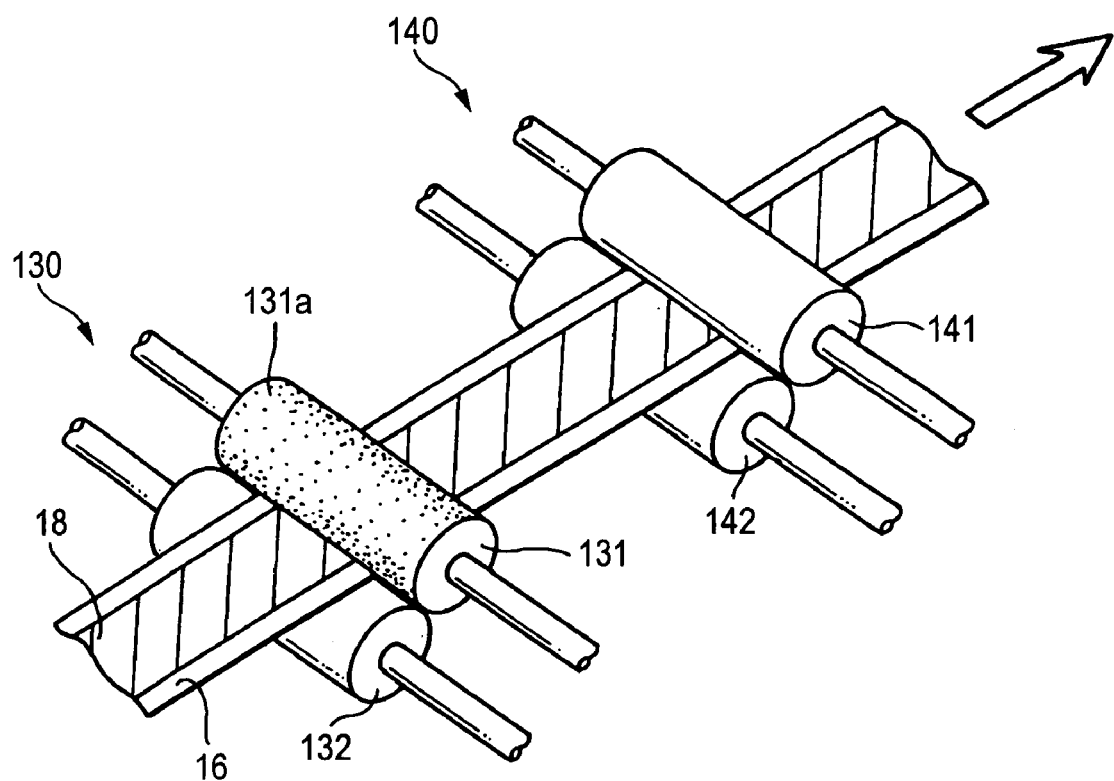
FIG. 5 is a view showing an example in which a rugged pattern is provided over substantially the whole area of the front surface 131a of a first roller 131.
Figure 6:
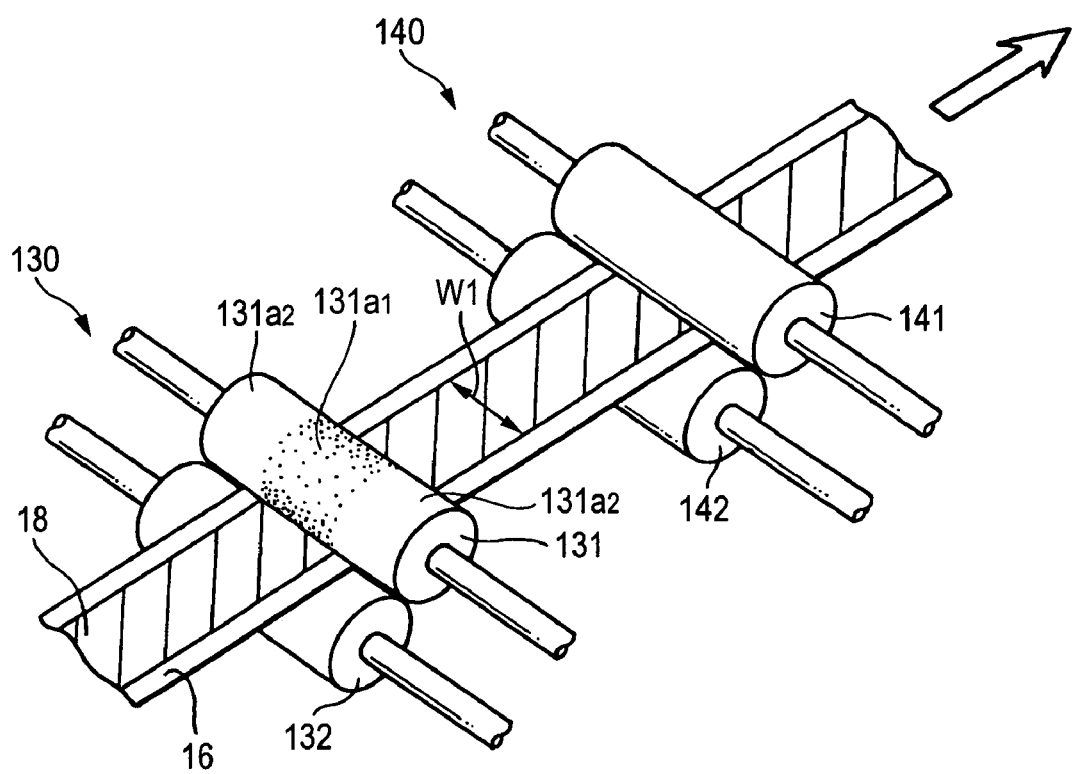
FIG. 6 is a view showing an example in which a rugged pattern is provided in only an area 131$a_1$ having substantially the same width as the width W1 of a polarizable electrode layer 18, in the front surface 131a of the first roller 131.

Insofar as the first roller 131 included in the first roll press section 130 is capable of embossing substantially the whole front surface of the polarizable electrode layer 18, it may well be provided with the rugged pattern over substantially the whole area of the front surface 131a as shown in FIG. 5. Alternatively, as shown in FIG. 6, the first roller 131 may well be provided with the rugged pattern in only an area $131a_1$ which has substantially the same width as the width W1 of the polarizable electrode layer 18, the other areas $131a_2$ being substantially smooth. With the type of the first roller 131 as shown in FIG. 5, it is permitted to reliably emboss the whole front surface of the polarizable electrode layer 18 even in a case where the laminated product 20 has deviated relative to the first roller 131 in the axial direction thereof. On the other hand, with the type of the first roller 131 as shown in FIG. 6, those parts of the current collector 16 which are not covered with the polarizable electrode layer 18 are not embossed, and it is therefore permitted to relieve a damage which is to be done to the current collector 16.

Figure 7:
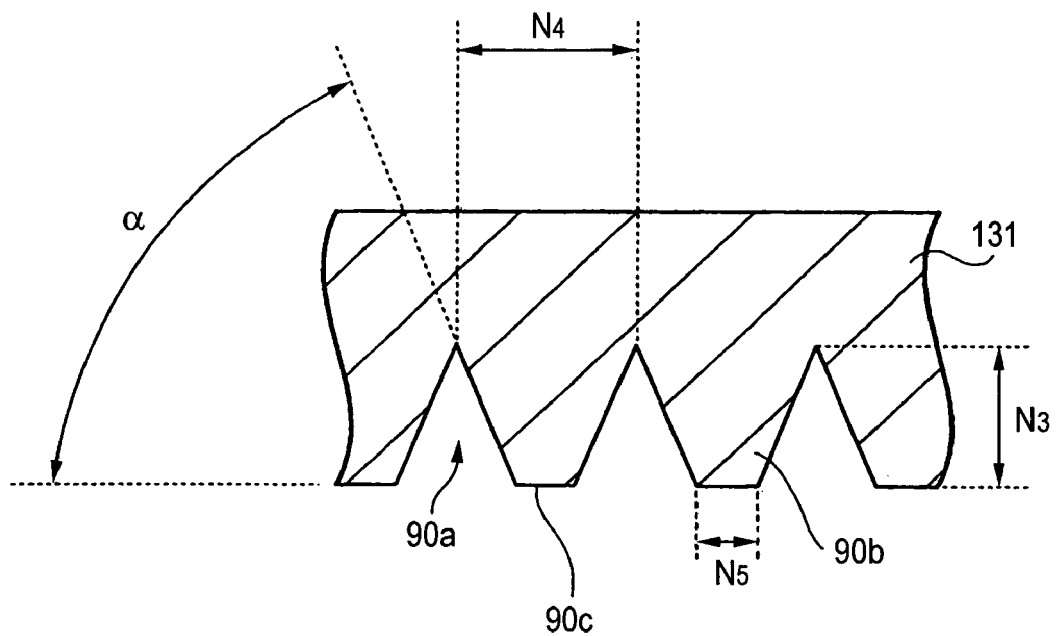
FIG. 7 is a view exaggeratedly showing the rugged pattern which is provided in the front surface 131a of the first roller 131, wherein (a) is a schematic sectional view, and (b) is a schematic plan view.
Figure 7:
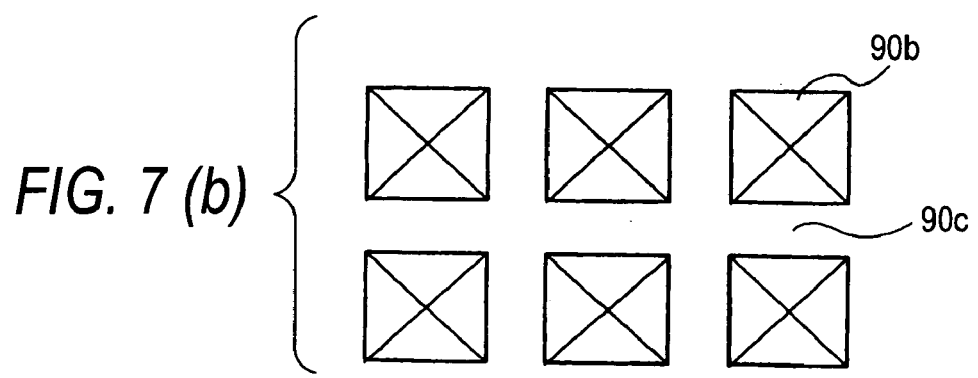

FIG. 7 is a view exaggeratedly showing the rugged pattern which is provided in the front surface 131a of the first roller 131, wherein (a) is a schematic sectional view, and (b) is a schematic plan view.

As shown in FIGS. 7(a) and (b), the front surface 131a of the first roller 131 is formed with concave parts 90a and convex parts 90b, and the plurality of concave parts 90a each having a conical shape are provided regularly at equal intervals. Besides, the convex parts 90b are located among the concave parts 90a. As already described, the perpendicular distance $N_3$ between the concave part 90a and the convex part 90b, that is, the height of the rugged pattern should preferably be set at 20% through 70% inclusive, of the thickness of the polarizable electrode layer 18 before the embossment work, more preferably at 30% through 60% inclusive. Besides, in this example, the convex part 90b has a flat part 90c, the width $N_5$ of which should favorably be set at 5–15 μm. In addition, the inclination α of the concave part 90a should preferably be set at 35°–75°, more preferably at 45°–65°.

Figure 8:
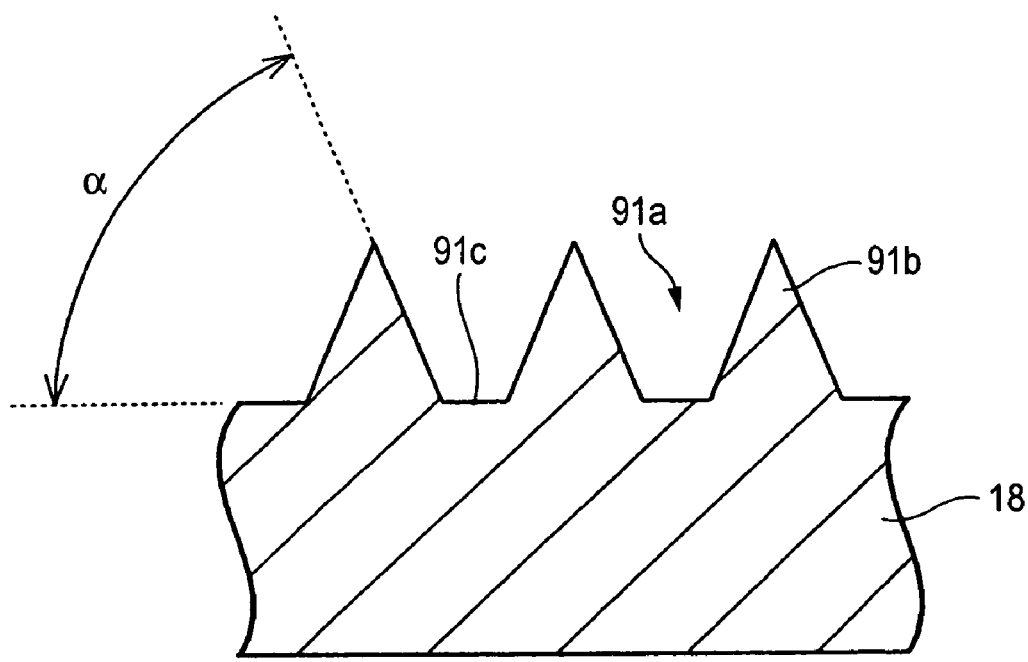
FIG. 8 is a view exaggeratedly showing that front surface of the polarizable electrode layer 18 which has been embossed by a first roll press section 130, wherein (a) is a schematic sectional view, and (b) is a schematic plan view.
Figure 8:
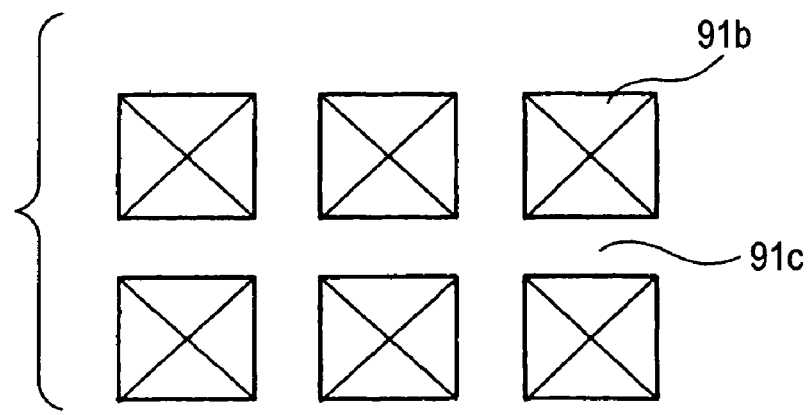

FIG. 8 is a view exaggeratedly showing that front surface of the polarizable electrode layer 18 which has been embossed by the first roll press section 130, wherein (a) is a schematic sectional view, and (b) is a schematic plan view.

As shown in FIGS. 8(a) and (b), the rugged pattern provided in the front surface 131a of the first roller 131 is transferred onto the front surface of the polarizable electrode layer 18 having passed through the first roll press section 130. More specifically, concave parts 91a are formed in areas corresponding to the convex parts 90b of the first roller 131, and convex parts 91b are formed in areas corresponding to the concave parts 90a of the first roller 131. Besides, areas corresponding to the flat parts 90c of the first roller 131 become flat parts 91c. Thus, the polarizable electrode layer 18 is compressed most strongly especially at the flat parts 91c, whereby the density of the polarizable electrode layer 18 is effectively heightened.

In this state, however, the density of the polarizable electrode layer 18 especially at the distal end parts of the convex parts 91b is not sufficient, and the porous grains P1 are apprehended to fall off from the convex parts 91b, on account of the shape of the distal end parts. Such problems are solved by the roll press based on the second roll press section 140 which is located downstream of the first roll press section 130.

More specifically, the second roll press section 140 is a portion for performing the process (step S5) for flattening the embossed front surface of the polarizable electrode layer 18. In the manufacturing apparatus 100 for the electrode for the electrochemical capacitor as shown in FIG. 4, the second roll press section 140 is constituted by a third roller 141 arranged on the side of the polarizable electrode layer 18, and a fourth roller 142 arranged on the side of the current collector 16. Both the front surfaces 141a and 142a of the third and fourth rollers 141 and 142 are substantially smooth, and the laminated product 20 is roll-pressed by such rollers 141 and 142, whereby the embossment formed on the front surface of the polarizable electrode layer 18 is flattened. That is, the convex parts 91b of the polarizable electrode layer 18 are collapsed, whereby the density is further heightened, and the porous grains P1 are prevented from falling off from the convex parts 91b.

The laminated product 20 having completed such roll press is guided by a guide roll 104 so as to be wound round the take-up roll 102.

In this manner, when the manufacturing apparatus 100 for the electrode for the electrochemical capacitor as shown in FIG. 4 is employed, it is permitted to continuously perform the steps S2–S5 stated above.

Figure 9:
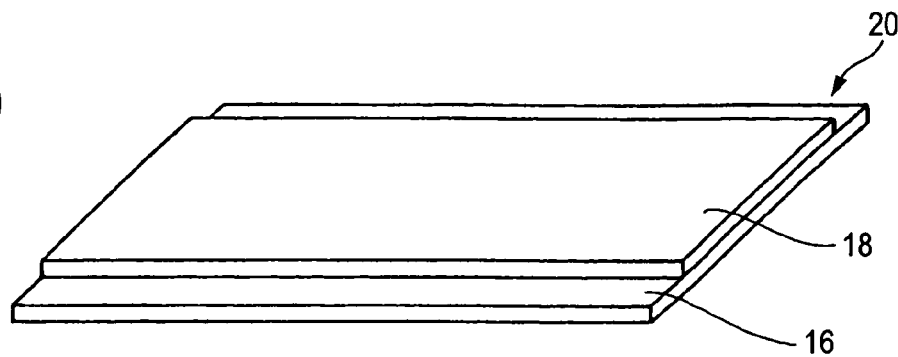
FIG. 9 is a view for explaining a process (step S6) for cutting the electrode 10 for the electrochemical capacitor, out of a laminated product 20, wherein (a) is a schematic plan view of the laminated product 20 which has been cut into a predetermined size, (b) is a schematic plan view of the laminated product 20 out of which the electrode 10 for the electrochemical capacitor has been cut, and (c) is a schematic plan view of the cut-out electrode 10 for the electrochemical capacitor.
Figure 9:
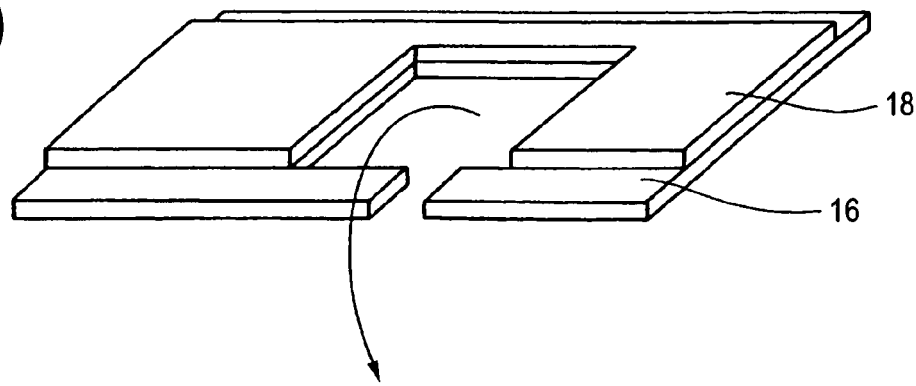
Figure 9:
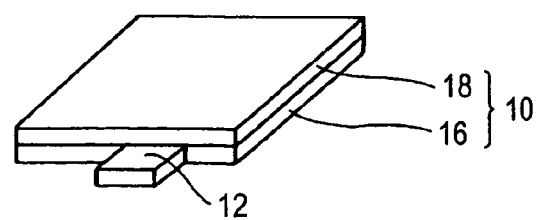

Besides, the laminated product 20 wound round the take-up roll 102 is cut into a predetermined size as shown in FIG. 9(a), and the laminated product 20 is punched in accordance with the scale of the electrochemical capacitor to-be-fabricated as shown in FIG. 9(b). Then, the electrode 10 for the electrochemical capacitor is finished up as shown in FIG. 9(c). On this occasion, that part of the current collector 16 which is not covered with the polarizable electrode layer 18 is simultaneously derived as shown in FIG. 9(c), it can be utilized as the lead-out electrode 12.

In the electrode 10 for the electrochemical capacitor as has been manufactured in the above way, the front surface of the polarizable electrode layer 18 has been embossed (step S4) and has thereafter been flattened (step S5), so that a high volume capacitance of at least 17 F/cm$^3$ can be achieved. Moreover, it is permitted to prevent the porous grains P1 from falling off, and to ensure a high reliability. Also, the pollution of the apparatus attributed to the porous grains P1 having fallen off is prevented.

Figure 10:
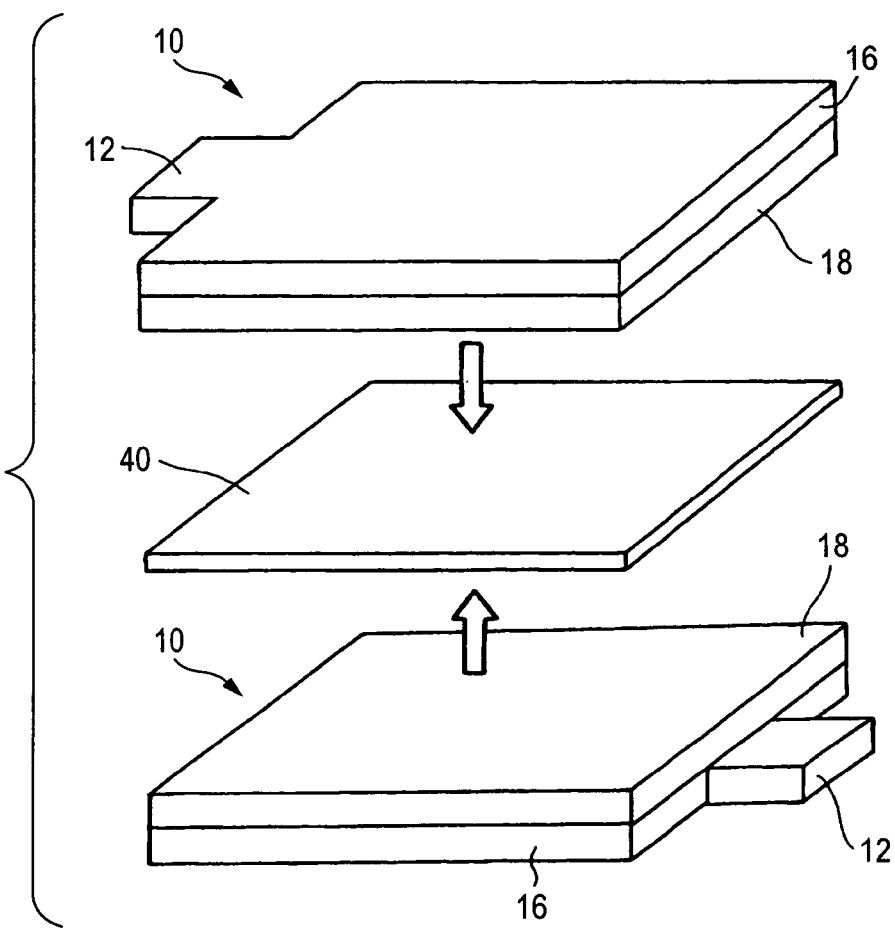
FIG. 10 is a model view for explaining a method for fabricating the electrochemical capacitor from the electrodes 10 for the electrochemical capacitor.

Besides, as shown in FIG. 10, at least two fabricated electrodes 10 for the electrochemical capacitor are prepared, and a separator 40 is held between the two electrodes 10 for the electrochemical capacitor with the polarizable electrode layers 18 confronting each other. Thereafter, the resulting structure is accommodated in a case not shown, and the case is filled up with an electrolyte solution. Then, the electrochemical capacitor is finished up.

The separator 40 should favorably be formed from an insulating porous substance. Usable as the separator 40 is, for example, a laminated product which consists of films of polyethylene, polypropylene or polyolefin, an extended film which is made from a mixture consisting of the above resins, or a fibrous or unwoven fabric material which is made from at least one constituent material selected from the group consisting of cellulose, polyester and polypropylene.

Besides, usable as the electrolyte solution is an electrolyte solution (an electrolytic aqueous solution, or an electrolyte solution using an organic solvent) which is employed in a known electrochemical capacitor such as electric double-layer capacitor. However, in a case where the electrochemical capacitor is the electric double-layer capacitor, the electrolytic aqueous solution exhibits a low decomposition voltage electrochemically, and hence, the useful-life voltage of the capacitor is limited to be low, so that the electrolyte solution using the organic solvent (non-aqueous electrolyte solution) is favorable. Although the concrete sort of the electrolyte solution is not especially restricted, the electrolyte solution should favorably be selected in consideration of the solubility and the dissociation degree of a solute and the viscosity of a liquid, and an electrolyte solution of high electric conductivity and high potential window (high decomposition initiation voltage) is especially desirable. Used as a typical example is tetraethyl ammonium tetrafluoroborate or the like class-4 ammonium salt which is dissolved in the organic solvent such as propylene carbonate, diethylene carbonate or acetonitrile. By the way, in this case, a mixing water content needs to be severely managed.

Thus far, the preferred embodiment of the invention has been described in detail, but the invention is not restricted to the embodiment.

Figure 11:
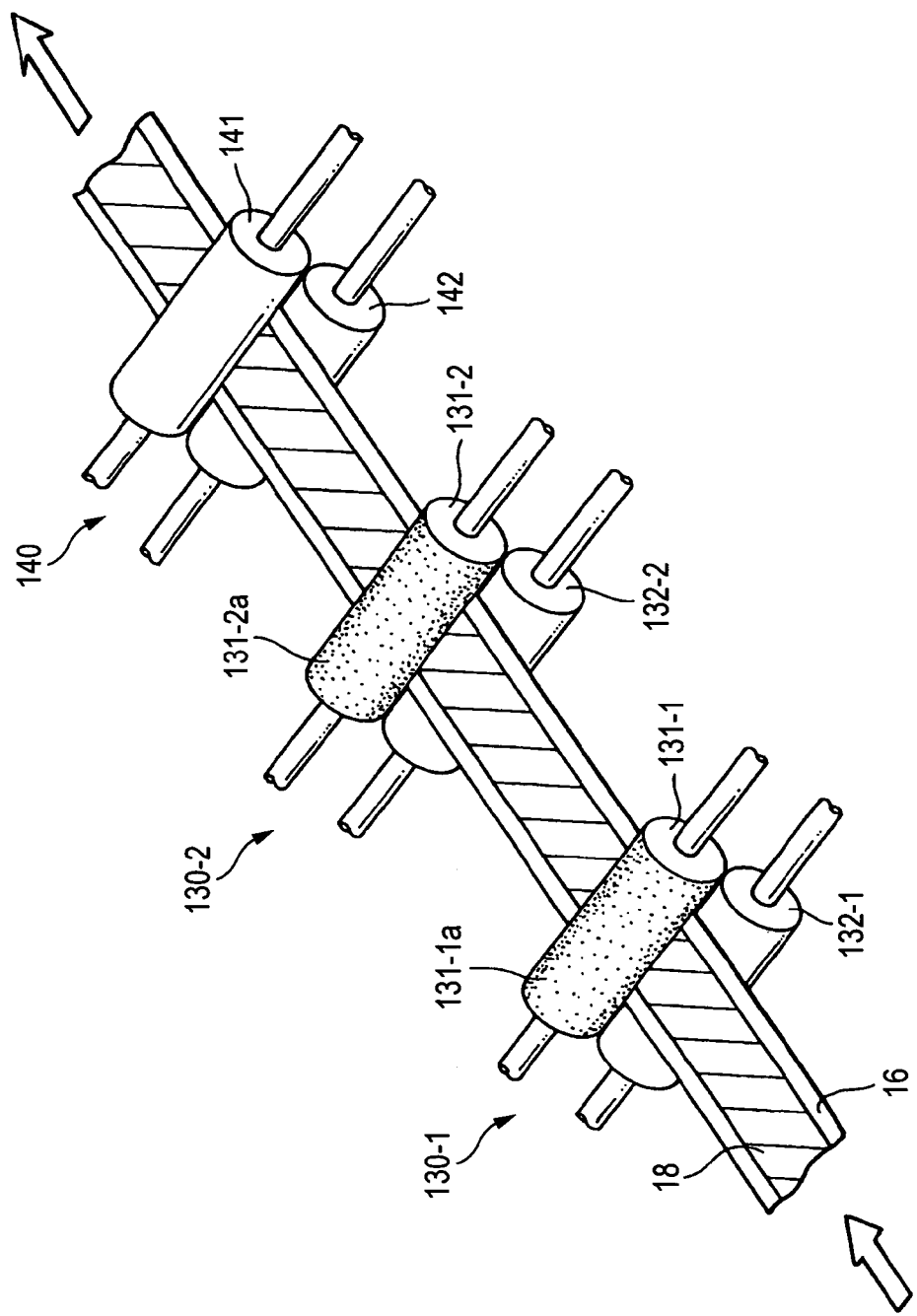
FIG. 11 is a view showing an example in which a plurality of first roll press sections 130 are disposed.

By way of example, although the embossment work for the front surface of the polarizable electrode layer 18 is performed only once in the embodiment, a plurality of times of embossment works may well be performed by disposing a plurality of first roll press sections 130 as shown in FIG. 11. In the example shown in FIG. 11, an upper stream side roll press section 130-1 and a lower stream side roll press section 130-2 are disposed, and the front surface 131-1a of a roller 131-1 included in the upper stream side roll press section 130-1, and the front surface 131-2a of a roller 131-2 included in the lower stream side roll press section 130-2 are respectively provided with rugged patterns. In this case, the rugged pattern provided in the front surface 131-1a of the roller 131-1, and the rugged pattern provided in the front surface 131-2a of the roller 131-2 need not be in an identical shape. By way of example, when the height of the rugged pattern is set larger in the roller 131-1 located on the upper stream side, than in the roller 131-2 located on the lower stream side, the polarizable electrode layer 18 is formed with a deep embossment by the upper stream side roll press section 130-1, and further, the embossment is flattened and a new shallow embossment is formed by the lower stream side roll press section 130-2. Besides, the shallow embossment formed by the lower stream side roll press section 130-2 is further flattened by a second roll press section 140.

Conversely, the height of the rugged pattern may well be set larger in the roller 131-2 located on the lower stream side, than in the roller 131-1 located on the upper stream side. In this case, the polarizable electrode layer 18 is formed with a comparatively shallow embossment by the upper stream side roll press section 130-1, and further, it is formed with a deep embossment by the lower stream side roll press section 130-2. Also in this case, the deep embossment formed by the lower stream side roll press section 130-2 is flattened by the second roll press section 140.

Alternatively, embossments of different shapes may well be formed in such a way that the heights of the rugged patterns are substantially equalized in the roller 131-1 located on the upper stream side and the roller 131-2 located on the lower stream side, while the pitches $N_4$ of the convex parts 90b or the inclinations a thereof (refer to FIG. 7) are made different from each other.

Incidentally, although not shown, a plurality of second roll press sections 140 may well be disposed, thereby to perform a plurality of times of flattening operations for the embossments.

Figure 12:
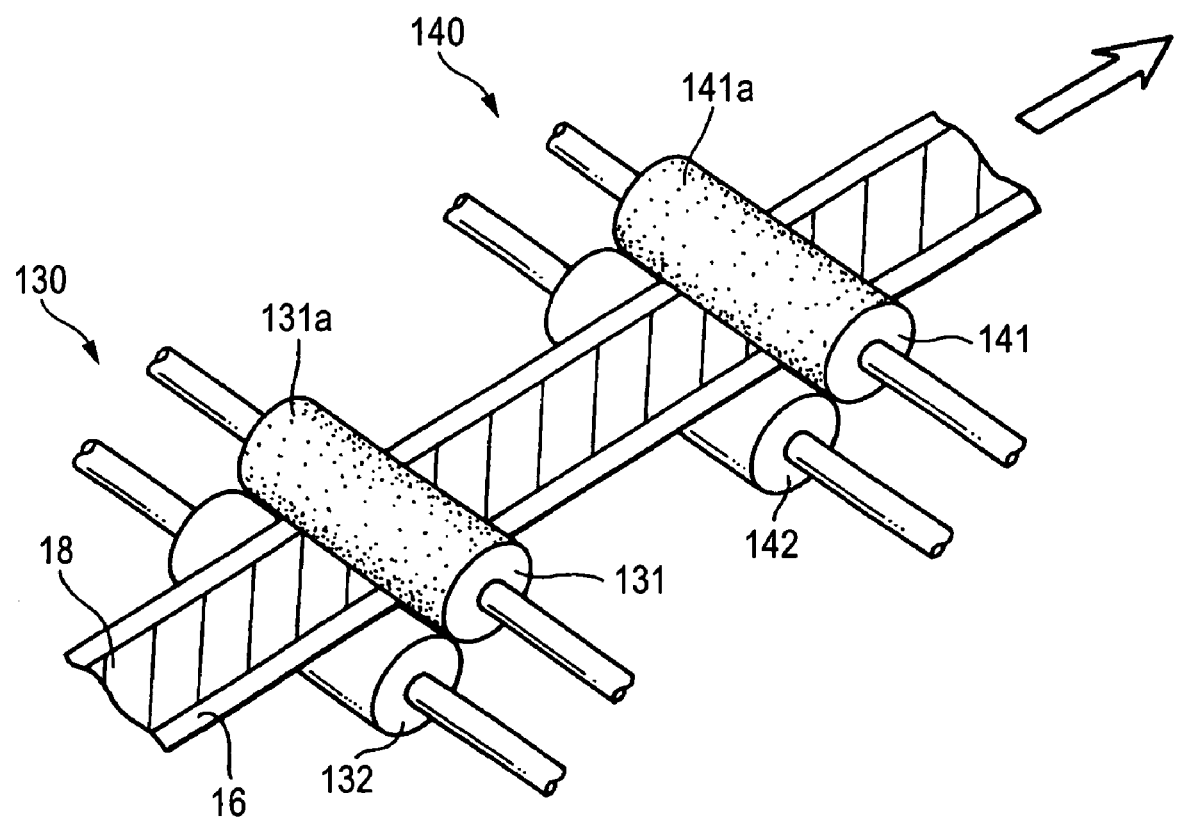
FIG. 12 is a view showing an example in which the front surface 141a of a third roller 141 included in a second roll press section 140 is provided with a rugged pattern of small height.

Further, as shown in FIG. 12, the front surface 141a of a third roller 141 which is included in a second roll press section 140 may well be provided with a rugged pattern of small height. According to this measure, a new shallow embossment is formed while a deep embossment formed by a first roll press section 130 is being flattened. In this case, however, for the purpose of satisfactorily preventing the porous grains P1 from falling off from the front surface of the polarizable electrode layer 18, the height of the rugged pattern which is provided in the front surface 141a of the third roller 141 should preferably be set at or below 15% of the thickness of the polarizable electrode layer 18 after the roll press by the first roll press section 130, more preferably at or below 10%.

Figure 13:
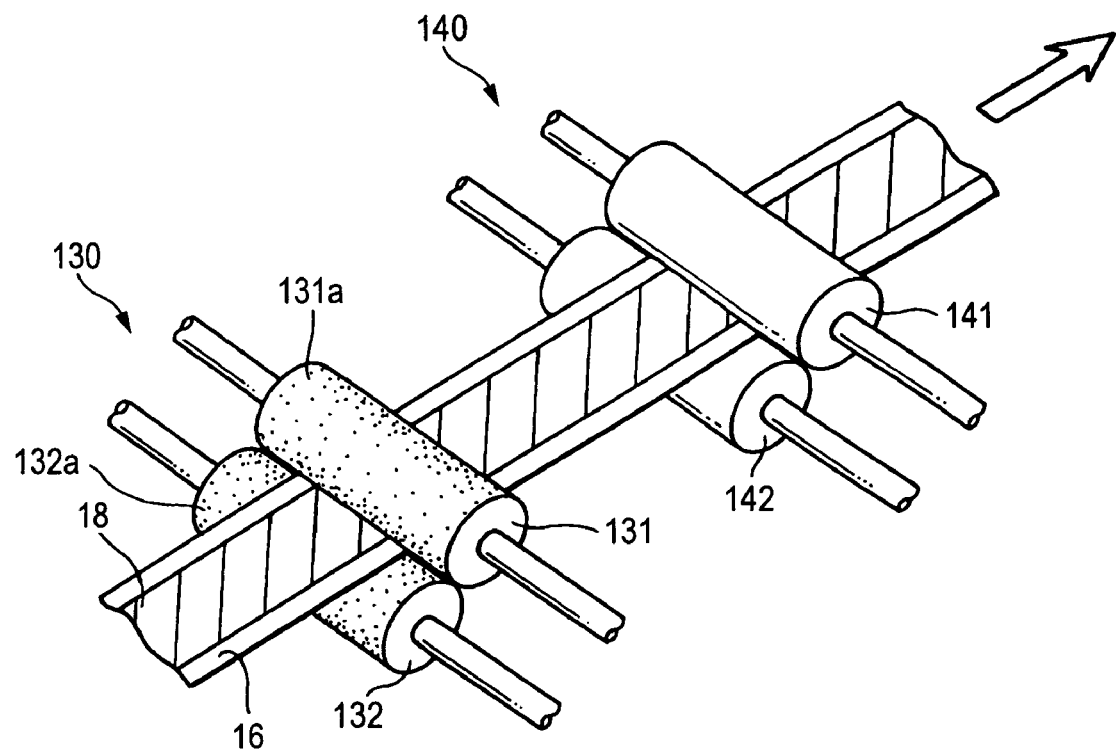
FIG. 13 is a view showing an example in which a rugged pattern is provided also in the front surface 132a of a second roller 132 included in a first roll press section 130.

Further, in the embodiment, only one surface of the current collector 16 is formed with the polarizable electrode layer 18, but both the surfaces of the current collector 16 can also be formed with polarizable electrode layers 18. In this case, as shown in FIG. 13, also the front surface 132a of a second roller 132 included in a first roll press section 130 may well be provided with a rugged pattern. According to this measure, the polarizable electrode layers 18 formed on both the surfaces of the current collector 16 can be simultaneously embossed.

Figure 14:
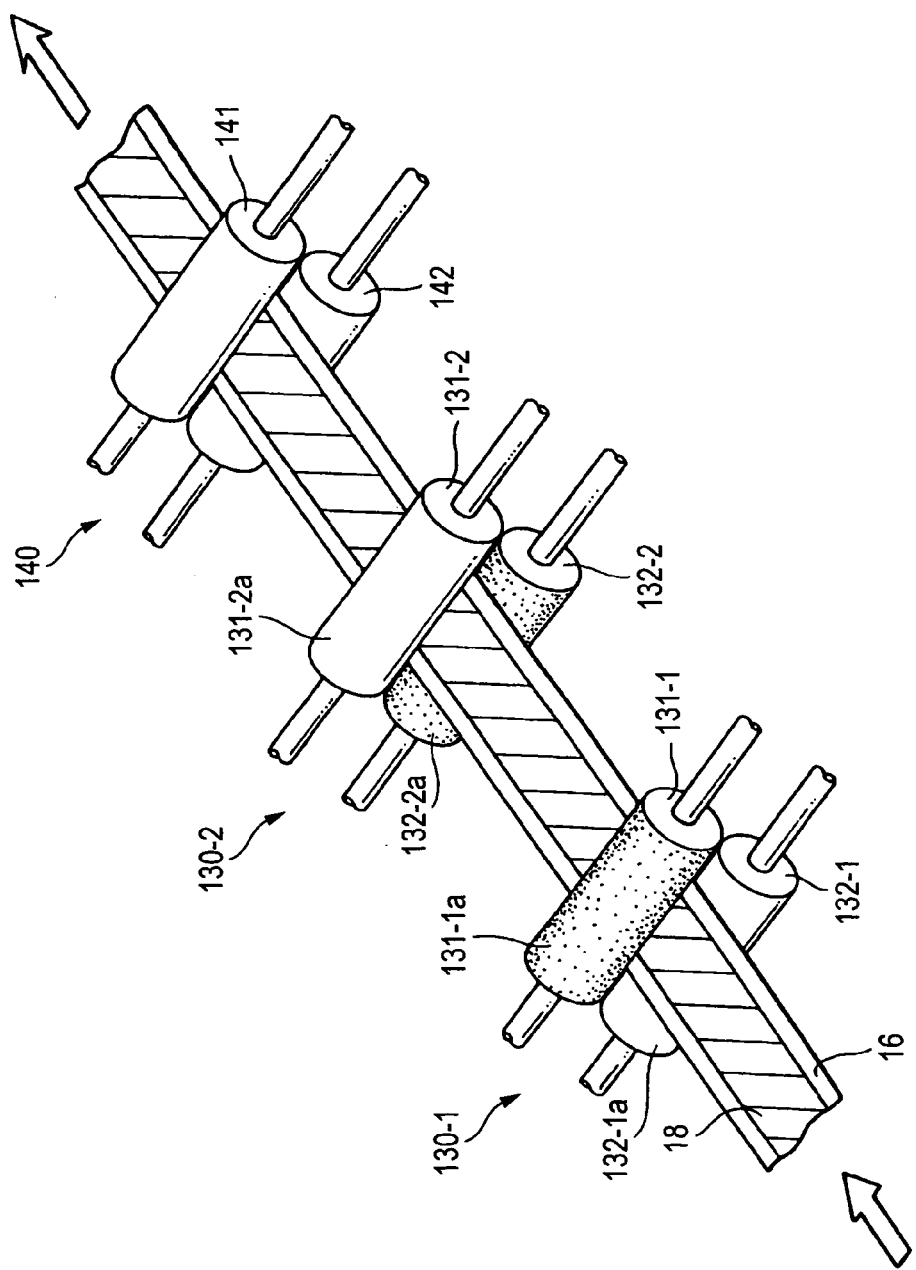
FIG. 14 is a view showing an example in which the front surface 131-1a of a roller 131-1 included in an upper stream side roll press section 130-1, and the front surface 132-2a of a roller 132-2 included in a lower stream side roll press section 130-2 are respectively provided with rugged patterns.

However, when both the first roller 131 and the second roller 132 are provided with rugged patterns, the polarizable electrode layers 18 might fail to be sufficiently compressed in some ways of the superposition of the rugged patterns, or contrariwise, a damage to the current collector 16 might become heavy due to excessive compression. In order to avoid this drawback, it is favorable that, as shown in FIG. 14, a first roll press section 130 is divided into an upper stream side roll press section 130-1 and a lower stream side roll press section 130-2, whereupon the front surface 131-1a of a roller 131-1 included in the upper stream side roll press section 130-1, and the front surface 132-2a of a roller 132-2 included in the lower stream side roll press section 130-2 are respectively provided with rugged patterns. According to this measure, the front surfaces 132-1a and 131-2a of the other rollers 132-1 and 131-2 are substantially smooth, respectively, so that the above problem does not occur.

Besides, the manufacturing apparatus for the electrode for the electrochemical capacitor according to the invention need not always have the construction in which, as in the apparatus shown in FIG. 4, the coating section 110, drying section 120, first roll press section 130 and second roll press section 140 are arranged continuously and unitarily, but it may well be the aggregate of two or more apparatuses as long as the above order is ensured. By way of example, the sheet-like current collector 16 having passed through the drying section 120 may well be taken up once and be roll-pressed by another apparatus which includes the first roll press section 130 and the second roll press section 140. Further, the first roll press section 130 and the second roll press section 140 may well be apparatuses which are separate from each other.

Incidentally, the electrode for the electrochemical capacitor as manufactured by the invention can be employed as an electrode for an electric double-layer capacitor, and it is also utilizable as an electrode for any of various electrochemical capacitors such as a pseudo-capacitance capacitor, a pseudo-capacitor and a Redox capacitor.

Second Embodiment

In an electrode 10 for an electrochemical capacitor according to this embodiment, a polarizable electrode layer 18 is embossed, whereby increase in the volume capacitance of the polarizable electrode layer 18 is attained. Although the details will be described later, the compression of the polarizable electrode layer 18 is insufficient, and the attainment of a volume capacitance of at least 17 F/cm$^3$ is difficult, merely by forming the polarizable electrode layer 18 and thereafter roll-pressing it with a roller whose front surface is substantially smooth. However, when the polarizable electrode layer 18 is roll-pressed using a roller whose front surface is provided with a rugged pattern, this polarizable electrode layer 18 is effectively compressed, whereby the volume capacitance of at least 17 F/cm$^3$ becomes attainable.

Meanwhile, in the electrode 10 for the electrochemical capacitor according to this embodiment, the bare portion 12 of a current collector 16 undergoes no embossment work over substantially the whole area thereof. The reasons therefor are that the current collector 16 itself need not be embossed, and that unfavorably the current collector 16 might be damaged when strongly embossed. In consideration of these points, only the polarizable electrode layer 18 is embossed in the electrode 10 for the electrochemical capacitor according to this embodiment. A method for embossing only the polarizable electrode layer 18 will be described later.

Figure 15:
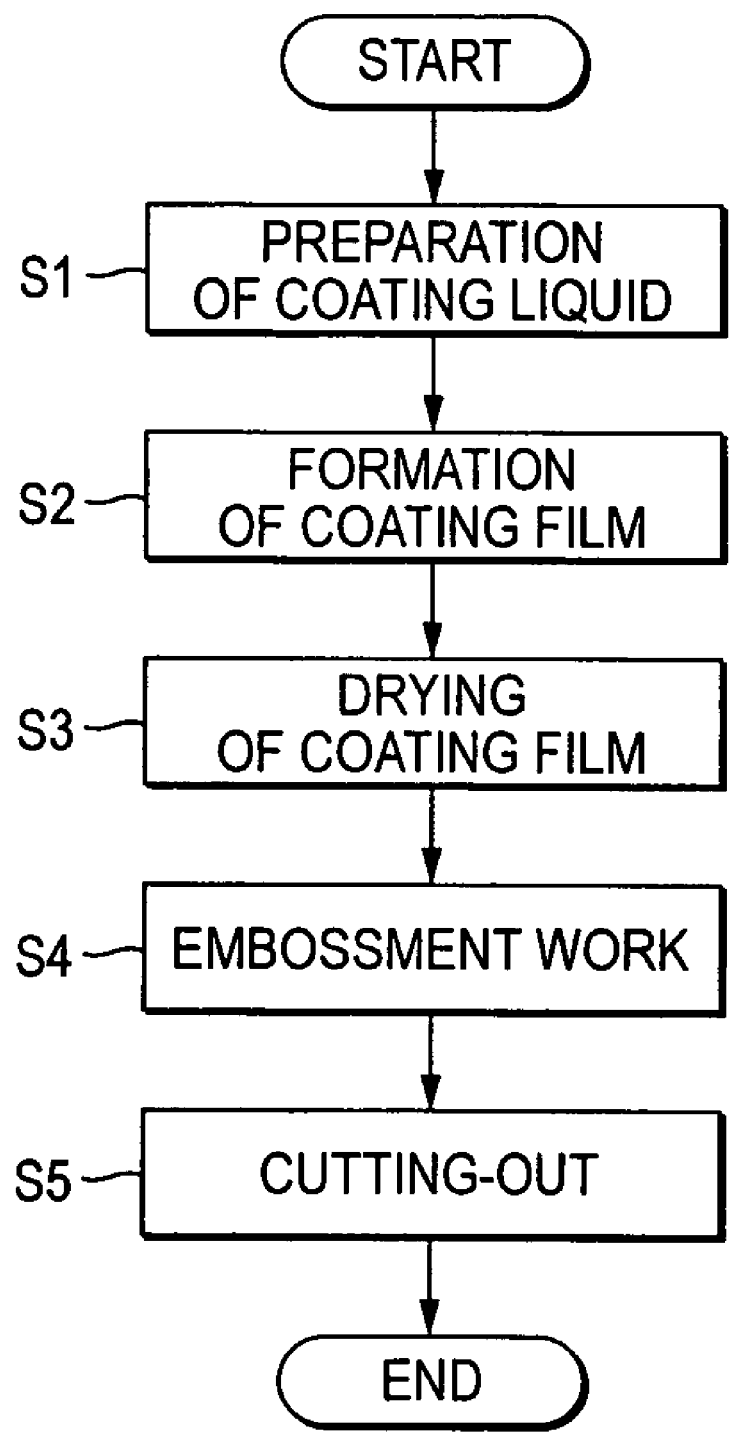
FIG. 15 is a flow chart for explaining a manufacturing method for an electrode for an electrochemical capacitor according to the second embodiment of the invention.

FIG. 15 is a flow chart for explaining the manufacturing method for the electrode for the electrochemical capacitor according to the preferred embodiment of the invention. Now, the manufacturing method for the electrode for the electrochemical capacitor according to this embodiment will be described with reference to the flow chart.

First of all, a coating liquid L1 to become the material of the polarizable electrode layer 18 is prepared (step S1), the surface of the current collector 16 is subsequently coated with the coating liquid L1, thereby to form a coating film (step S2), and a liquid S1 contained in the coating film is removed by drying (step S3). Thus, a state is established where the polarizable electrode layer 18 not compressed yet has been formed on the current collector 16. On this occasion, the polarizable electrode layer 18 is formed having a predetermined width, so that the bare portions 12 of the current collector 16 may be left behind at both the end parts of the current collector 16 in the widthwise direction thereof. Since these steps are the same as in the first embodiment, they shall be omitted from detailed description.

After the uncompressed polarizable electrode layer 18 has been formed on the current collector 16 in this way, the front surface of the polarizable electrode layer 18 is embossed (step S4) by subjecting the bare portions 12 of the current collector 16 to substantially no embossment work. As stated above, the embossment work of the front surface of the polarizable electrode layer 18 is done for effectively compressing the polarizable electrode layer 18, thereby to heighten a volume capacitance. In this case, after the front surface of the polarizable electrode layer 18 has been embossed, it should favorably be further flattened. When such flattening is done, it is permitted to effectively prevent porous grains P1 from falling off from the embossed front surface of the polarizable electrode layer 18. More specifically, when the front surface is strongly embossed (in a case, for example, where the height of a rugged pattern to be stated later is large), the porous grains P1 are liable to fall off, and hence, it is apprehended to degrade the reliability of a product or to pollute a manufacturing apparatus. In this embodiment, however, it is not indispensable to perform the flattening of the embossment.

A method for embossing the front surface of the polarizable electrode layer 18 can be incarnated in such a way, for example, that a roller or the like transfer member whose front surface is provided with the rugged pattern is pressed against the front surface of the polarizable electrode layer 18. In this case, the height of the rugged pattern provided in the front surface of the transfer member should preferably be set at 20%–70% inclusive, of the thickness of the polarizable electrode layer 18 before the embossment work, and it should more preferably be set at 30%–60% inclusive. The reason therefor is that, when the height of the rugged pattern is excessively small, the polarizable electrode layer 18 is not effectively compressed, whereas when the height of the rugged pattern is excessively large, a damage to be done to the current collector 16 becomes heavy.

According to the second embodiment, in the manufacturing apparatus 100 for the electrode for the electrochemical capacitor as shown in FIG. 4, the front surface 131a of the first roller 131 is partially provided with the rugged pattern as stated below, whereby the rugged pattern is transferred onto the front surface of the polarizable electrode layer 18 having passed through the first roll press section 130. That is, the front surface of the polarizable electrode layer 18 is embossed. On the other hand, the front surface 132a of the second roller 132 is substantially smooth.

Figure 16:
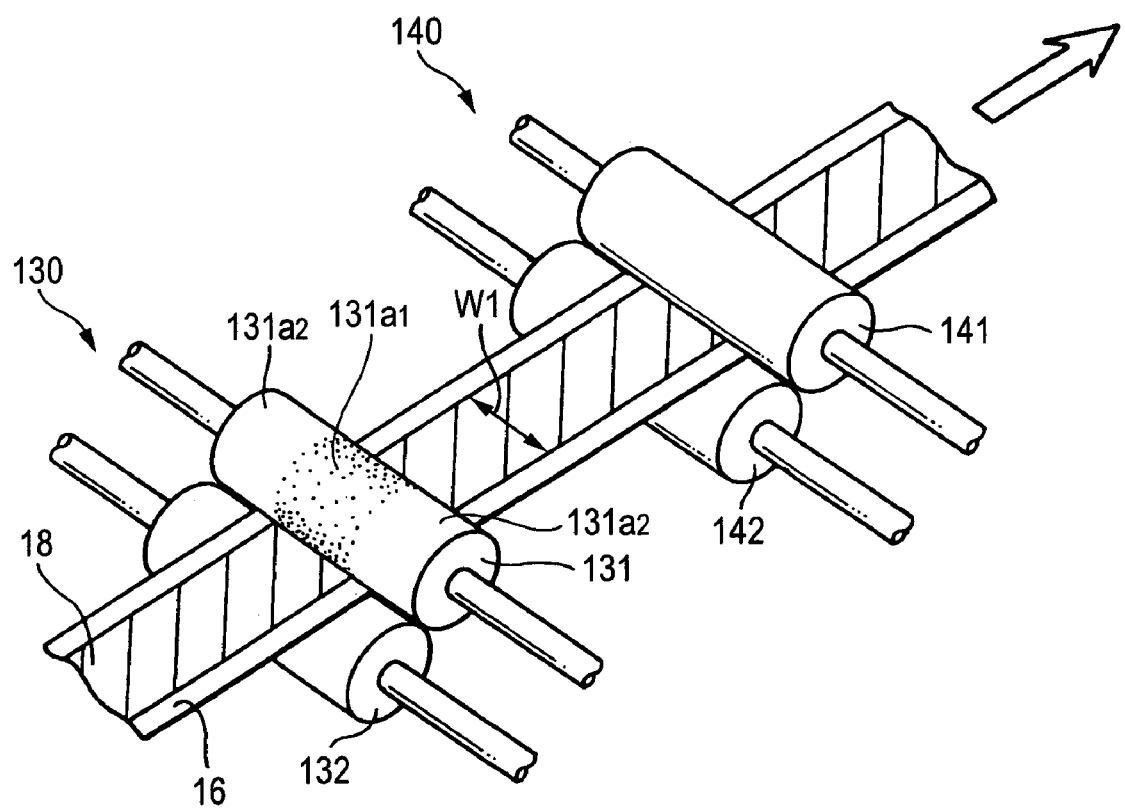
FIG. 16 is a schematic perspective view exaggeratedly showing a first roll press section 130 according to the second embodiment (and a second roll press section 140).

FIG. 16 is a schematic perspective view exaggeratedly showing the first roll press section 130 (and second roll press section 140).

As shown in FIG. 16, the first roller 131 included in the first roll press section 130 is provided with the rugged pattern in only an area 131$a_1$ which has substantially the same width as the width W1 of the polarizable electrode layer 18, the other areas 131$a_2$ being substantially smooth. Thus, only the front surface of the polarizable electrode layer 18 can be embossed by subjecting the bare portions 12 of the current collector 16 to substantially no embossment work. It is consequently permitted to relieve a damage which is to be done to the current collector 16, with the polarizable electrode layer 18 effectively compressed. Moreover, since the areas 131$a_2$ corresponding to the bare portions 12 of the current collector 16 are substantially smooth, the possibility at which a laminated product 20 having passed through the first roll press section 130 will be wound round the first roller 131 becomes low to enhance a job efficiency.

In the same manner as in the first embodiment, as shown in FIGS. 7(a) and (b), the concave parts 90a and the convex parts 90b are formed in the area 131a₁ of the front surface 131a of the first roller 131, and the plurality of concave parts 90a each having a conical shape are provided regularly at equal intervals. Detailed description shall be omitted here.

Also in the same manner as in the first embodiment, as shown in FIGS. 8(a) and (b), the rugged pattern provided in the area 131a₁ of the front surface 131a of the first roller 131 is transferred onto the front surface of the polarizable electrode layer 18 having passed through the first roll press section 130. Since the areas 131a₂ of the front surface 131a of the first roller 131 are substantially smooth as stated above, such an embossment is not formed in each of the bare portions 12 of the current collector 16. However, those regions of the bare portions 12 of the current collector 16 which are near to the polarizable electrode layer 18 may well be somewhat embossed in relation to a machining precision. Accordingly, the expression "substantially the whole areas of the bare portions 12 of the current collector 16 are not embossed" shall cover the case where the slight regions of the bare portions extending along the polarizable electrode layer 18 are embossed in relation to the machining precision.

In this state, however, the density of the polarizable electrode layer 18 especially at the distal end parts of the convex parts 91b might not be sufficient. In this case, the porous grains P1 are apprehended to fall off from the convex parts 91b, on account of the shape of the distal end parts. Such problems are solved by roll press based on the second roll press section 140 which is located downstream of the first roll press section 130.

More specifically, the second roll press section 140 is a portion for flattening the embossed front surface of the polarizable electrode layer 18. In the manufacturing apparatus 100 for the electrode for the electrochemical capacitor as shown in FIG. 4, the second roll press section 140 is constituted by a third roller 141 arranged on the side of the polarizable electrode layer 18, and a fourth roller 142 arranged on the side of the current collector 16. Both the front surfaces 141a and 142a of the third and fourth rollers 141 and 142 are substantially smooth, and the laminated product 20 is roll-pressed by such rollers 141 and 142, whereby the embossment formed on the front surface of the polarizable electrode layer 18 is flattened. That is, the convex parts 91b of the polarizable electrode layer 18 are collapsed, whereby the density is further heightened, and the porous grains P1 are prevented from falling off from the convex parts 91b. It is not indispensable, however, that the manufacturing apparatus according to this embodiment includes the second roll press section for flattening the embossment.

Incidentally, the pressure of the roll press for the embossment work and the flattening should favorably be set at 4900 N/cm (500 kgf/cm)–24500 N/cm (2500 kgf/cm).

The laminated product 20 having completed such roll press is guided by a guide roll 104 so as to be wound round a take-up roll 102.

In this manner, when the manufacturing apparatus 100 for the electrode for the electrochemical capacitor as shown in FIG. 4 is employed, it is permitted to continuously perform the steps S2–S5 stated above.

Besides, the laminated product 20 wound round the take-up roll 102 is cut into a predetermined size as shown in FIG. 9(a), and the laminated product 20 is punched in accordance with the scale of the electrochemical capacitor to-be-fabricated as shown in FIG. 9(b). Then, the electrode 10 for the electrochemical capacitor is finished up as shown in FIG. 9(c). On this occasion, that part of the current collector 16 which is not covered with the polarizable electrode layer 18, namely, part of the bare portion 12 is simultaneously derived as shown in FIG. 9(c), and it can be utilized as a lead-out electrode.

In the electrode 10 for the electrochemical capacitor as has been manufactured in the above way, the front surface of the polarizable electrode layer 18 has been embossed (step S4), so that a high volume capacitance of at least 17 F/cm³ can be achieved. Moreover, since the bare portions 12 of the current collector 16 are subjected to substantially no embossment work, it is permitted to relieve a damage to the current collector 16 and the winding of the laminated product round the first roller 131. Besides, when the embossment formed on the front surface of the polarizable electrode layer 18 is flattened using the second roll press section 140, it is permitted to prevent the porous grains P1 from falling off, and to ensure a high reliability. Also, the pollution of the apparatus attributed to the porous grains P1 having fallen off is prevented.

Besides, as shown in FIG. 10, at least two fabricated electrodes 10 for the electrochemical capacitor are prepared, and a separator 40 is held between the two electrodes 10 for the electrochemical capacitor with the polarizable electrode layers 18 confronting each other. Thereafter, the resulting structure is accommodated in a case not shown, and the case is filled up with an electrolyte solution. Then, the electrochemical capacitor is finished up.

Thus far, the preferred embodiment of the invention has been described in detail, but the invention is not restricted to the embodiment.

Figure 17:
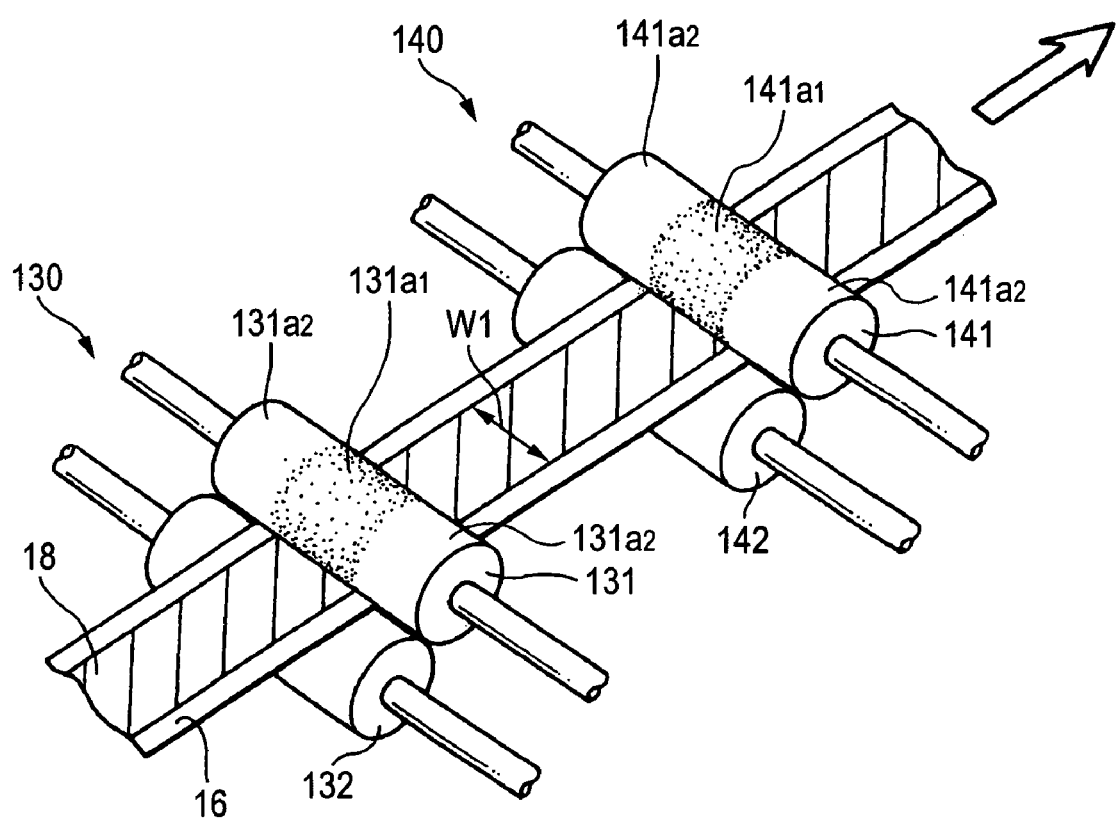
FIG. 17 is a view showing an example in which a rugged pattern is provided also in the area 141$a_1$ of the front surface 141a of a third roller 141 included in the second roll press section 140 according to the second embodiment.

By way of example, although the embossment work for the front surface of the polarizable electrode layer 18 is performed only once in the embodiment, a plurality of times of embossment works for the front surface of the polarizable electrode layer 18 may well be performed in such a way that, as shown in FIG. 17, the third roller 141 included in the second roll press section 140 is also provided with a rugged pattern in an area 141a₁ having substantially the same width as the width W1 of the polarizable electrode layer 18, the other areas 141a₂ being made substantially smooth. In this case, the rugged pattern provided in the area 131a₁ of the front surface 131 of the first roller 131, and the rugged pattern provided in the area 141a₁ of the front surface 141 of the third roller 141 need not be in an identical shape. By way of example, when the height of the rugged pattern is set larger in the first roller 131 located on the upper stream side, than in the third roller 141 located on the lower stream side, the polarizable electrode layer 18 is formed with a deep embossment by the first roll press section 130, and further, the embossment is flattened and a new shallow embossment is formed by the second roll press section 140.

Conversely, the height of the rugged pattern may well be set larger in the third roller 141 located on the lower stream side, than in the first roller 131 located on the upper stream side. In this case, the polarizable electrode layer 18 is formed with a comparatively shallow embossment by the first roll press section 130, and further, it is formed with a deeper embossment by the second roll press section 140.

Alternatively, embossments of different shapes may well be formed in such a way that the heights of the rugged patterns are substantially equalized in the first roller 131 and the third roller 141, while the pitches N₄ of the convex parts 90b or the inclinations α thereof (refer to FIG. 7) are made different from each other.

Even in the case where the embossment works for the polarizable electrode layer 18 are performed the plurality of times in this manner, the bare portions 12 of the current collector 16 are subjected to substantially no embossment work when the areas $131a_2$ and the areas $141a_2$ corresponding to the bare portions 12 of the current collector 16 are made substantially smooth as shown in FIG. 17. It is therefore permitted to relieve a damage to the current collector 16 and the winding of the laminated product round the first roller 131.

Figure 18:
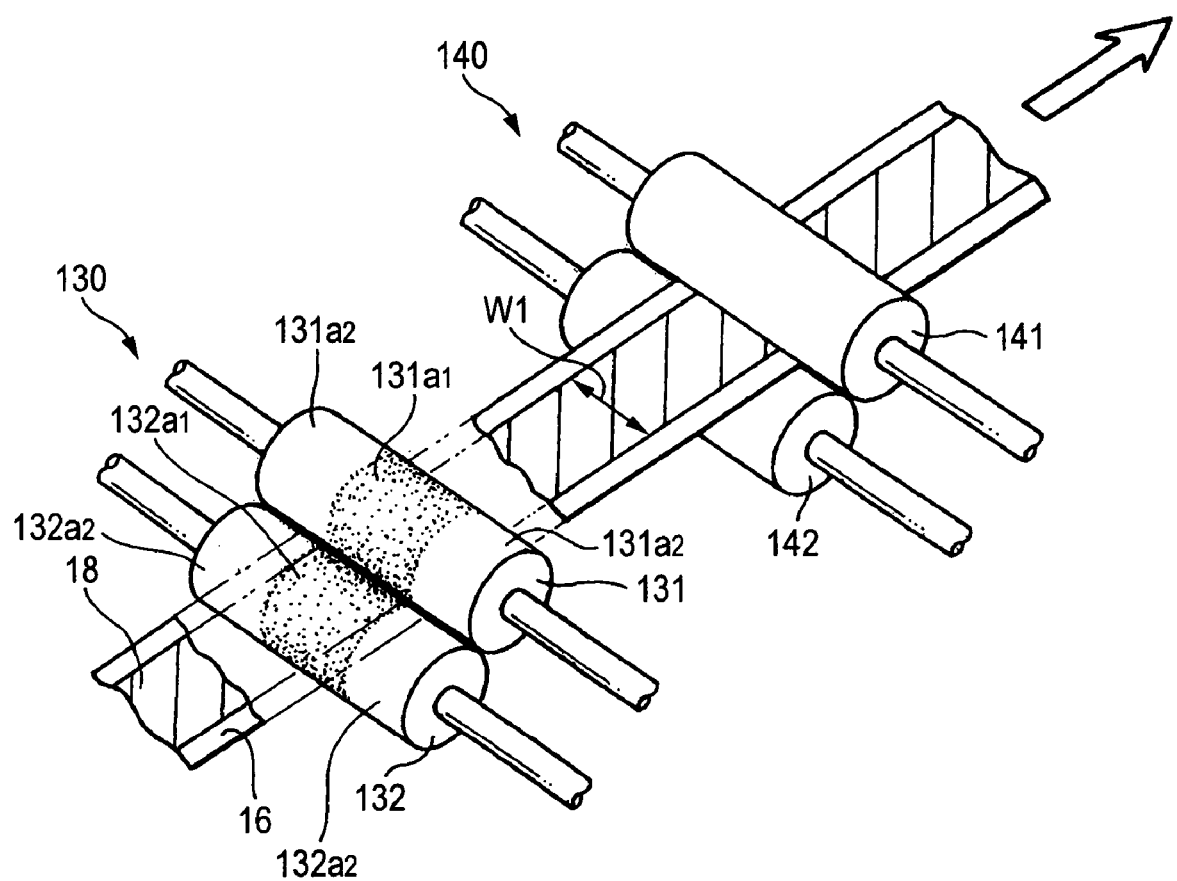
FIG. 18 is a view showing an example in which a rugged pattern is provided also in the area 132$a_1$ of the front surface 132a of a second roller 132 included in the first roll press section 130 according to the second embodiment.

Further, in the embodiment, only one surface of the current collector 16 is formed with the polarizable electrode layer 18, but both the surfaces of the current collector 16 can also be formed with polarizable electrode layers 18. In this case, as shown in FIG. 18, also the front surface 132a of a second roller 132 included in a first roll press section 130 may be provided with a rugged pattern. According to this measure, the polarizable electrode layers 18 formed on both the surfaces of the current collector 16 can be simultaneously embossed. Also in this case, it is permitted to relieve a damage to the current collector 16 and the winding of the laminated product round the second roller 132 when the rugged pattern is provided in the area $132a_1$ having substantially the same width as the width W1 of the polarizable electrode layer 18, the other areas $132a_2$ being made substantially smooth.

Figure 19:
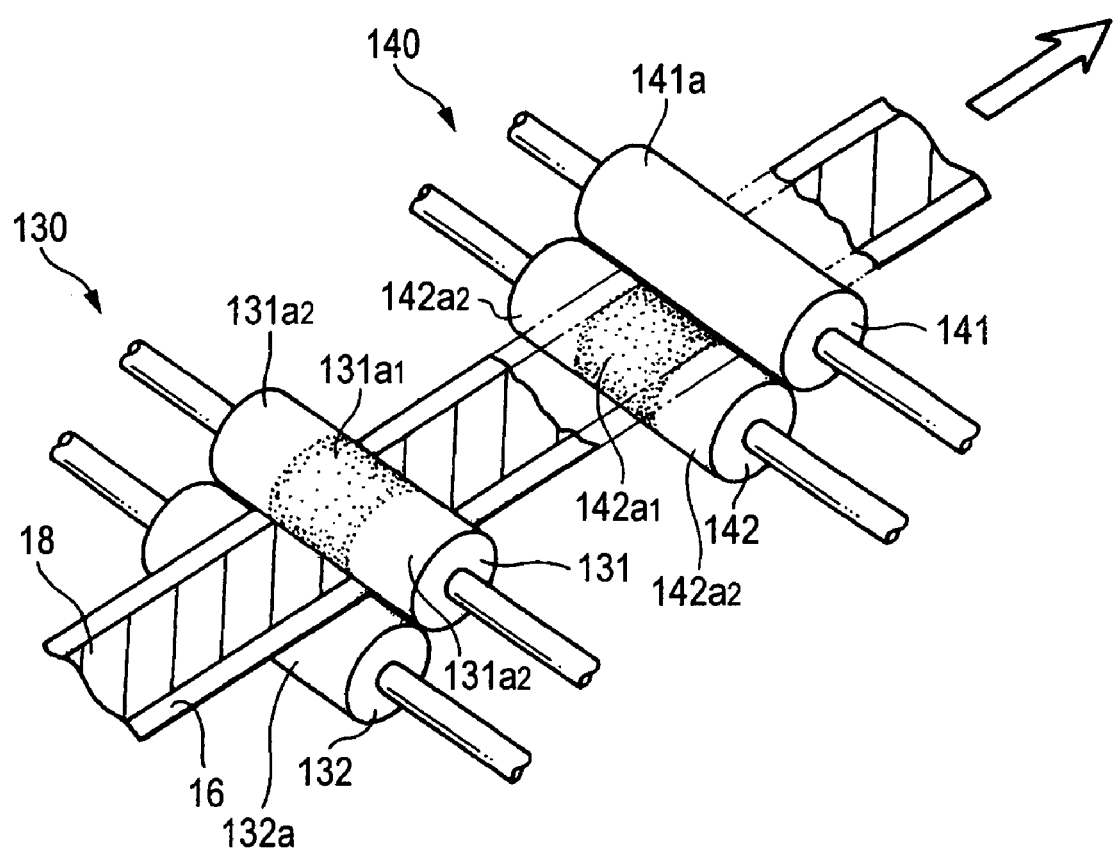
FIG. 19 is a view showing an example in which a rugged pattern is provided also in the area 142$a_1$ of the front surface 142a of a fourth roller 142 included in the second roll press section 140 according to the second embodiment.

However, when both the first roller 131 and the second roller 132 are provided with the rugged patterns, the polarizable electrode layers 18 might fail to be sufficiently compressed in some ways of the superposition of the rugged patterns, or contrariwise, a damage to the current collector 16 might become heavy due to excessive compression. In order to avoid this drawback, it is recommendable that, as shown in FIG. 19, the front surface of a fourth roller 142 included in a second roll press section 140 is provided with a rugged pattern, while the front surface of a second roller 132 included in a first roll press section 130 is made substantially smooth. Also in this case, it is permitted to relieve a damage to the current collector 16 and the winding of the laminated product round the fourth roller 142 when the front surface of the fourth roller 142 is provided with the rugged pattern in the area $142a_1$ having substantially the same width as the width W1 of each polarizable electrode layer 18, the other areas $142a_2$ being made substantially smooth. According to this measure, the front surfaces 132a and 141a of the other rollers 132 and 141 are substantially smooth in both the first roll press section 130 and the second roll press section 140, respectively, so that the above problem does not occur.

Besides, the manufacturing apparatus for the electrode for the electrochemical capacitor according to the invention need not always have the construction in which, as in the apparatus shown in FIG. 4, the coating section 110, drying section 120, first roll press section 130 and second roll press section 140 are arranged continuously and unitarily, but it may well be the aggregate of two or more apparatuses as long as the above order is ensured. By way of example, the sheet-like current collector 16 having passed through the drying section 120 may well be taken up once and be roll-pressed by another apparatus which includes the first roll press section 130 and the second roll press section 140. Further, the first roll press section 130 and the second roll press section 140 may well be apparatuses which are separate from each other. As already described, however, it is not indispensable that the manufacturing apparatus according to the invention includes the second roll press section for flattening the embossment.

Further, in the embodiment, only the polarizable electrode layer 18 is subjected to the embossment work, and substantially the whole areas of the bare portions 12 of the current collector 16 are not subjected to the embossment work, but those regions of the bare portions 12 of the current collector 16 which are near to the polarizable electrode layer 18 may well be partially embossed as long as the above advantages of the invention are attainable. By way of example, the width of the area $131a_1$ of the first roller 131 may well be set somewhat broad, thereby to emboss the bare portions 12 in the vicinities of the polarizable electrode layer 18. In this case, the current collector 16 might be damaged at the embossed parts, depending upon the height of a rugged pattern, but the whole front surface of the polarizable electrode layer 18 can be reliably embossed.

Further, in the embodiment, the embossment work (and the flattening) is performed for the polarizable electrode layer 18 by the roll press. However, this aspect is not restrictive, but the embossment work (and the flattening) may well be performed using a plate-shaped press device such as hot press.

Besides, it suffices to perform the embossment work of the polarizable electrode layer 18 in the region which is to be cut out as the electrode for the electrochemical capacitor, so that the other region need not be subjected to the embossment work. By way of example, in FIG. 9, the region except the portion cut out as the electrode 10 for the electrochemical capacitor need not undergo the embossment work. Accordingly, substantially smooth areas may well exist at regular intervals (each being larger than the size of the electrode to-be-cut-out) in the peripheral direction of the area $131a_1$ of the first roller 131 shown in FIG. 14. Moreover, a substantially smooth area may well exist at substantially the middle part of the first roller 131 in the widthwise direction thereof, depending upon the shape of the electrode to-be-cut-out for the electrochemical capacitor and the coating width of the polarizable electrode layer 18. Further, the smooth areas may well be combined.

Besides, in the embodiment, the polarizable electrode layer 18 is formed by coating so that the bare portions 12 may be formed at both the end parts of the current collector 16 in the widthwise direction thereof. However, this aspect is not restrictive, but the polarizable electrode layers 18 and the bare portions 12 may well be alternately formed at regular intervals in the lengthwise direction of the current collector 16. In this case, the bare portions 12 may well be formed in such a way that masking tape pieces are stuck on the current collector 16 at the regular intervals beforehand, whereupon the resulting structure is coated with the polarizable electrode layer 18, which is then dried. Besides, after the embossment work has been performed with the masking tape pieces left stuck, the masking tape pieces are stripped off. Then, the current collector 16 is bared at the corresponding parts, and the bare portions 12 having undergone no embossment work can be obtained.

Incidentally, the electrode for the electrochemical capacitor according to the invention can be employed as an electrode for an electric double-layer capacitor, and it is also utilizable as an electrode for any of various electrochemical capacitors such as a pseudo-capacitance capacitor, a pseudo-capacitor and a Redox capacitor.

EXAMPLES

Examples of the present invention will now be described, but the invention shall not be restricted to the examples at all.

Example 1

Granular active carbon (produced by Kuraray Chemical Co., Ltd., trade name: "RP-20") and acetylene black (produced by Denki Kagaku Kogyo Kabushiki Kaisha, trade name: "Denka Black") were mixed for 15 minutes by using a planetary mixer. The resulting mixture and fluorine rubber (produced by Du Pont Kabushiki Kaisha, trade name: "Viton-GF") were thrown into 150 mass-parts of MIBK, and these materials were kneaded for 45 minutes by using a planetary mixer. On this occasion, the compounding proportions of the active carbon, the acetylene black and the fluorine rubber were 90.0 mass-parts, 1.0 mass-part and 9.0 mass-parts, respectively. 150 mass-parts of MIBK were further added to the kneaded material obtained, and the resulting material was agitated for one hour. Thus, a coating liquid was prepared.

One surface of an aluminum foil (thickness: 20 μm) being a current collector was uniformly coated with the coating liquid by gravure coating, and the MIBK was removed in a drying oven at 100° C., thereby to obtain a laminated sheet. Thereafter, the laminated sheet was passed through the first roll press section 130 and the second roll press section 140 shown in FIG. 5, in the order mentioned, whereby a laminated sheet having a thickness of 150 μm was fabricated.

Here, the height ($N_3$) of a rugged pattern provided in the front surface 131a of the first roller 131 was 75 μm, the pitch ($N_4$) of concave parts 90a was 97 μm, and the width ($N_5$) of each flat part 90c was 10 μm. Besides, the inclination ($\alpha$) of the concave part 90a was set at 60°. In addition, press pressures based on the first roll press section 130 and the second roll press section 140 were both set at a value of 9800 $N/cm^2$ (1000 $kgf/cm^2$).

Comparative Example 1

A laminated sheet was fabricated in the same way as in Example 1, except that a roll press section identical to the first roll press section 130 was employed instead of the second roll press section 140.

Comparative Example 2

A laminated sheet was fabricated in the same way as in Example 1, except that a roll press section identical to the second roll press section 140 was employed instead of the first roll press section 130.

Comparative Example 3

A laminated sheet was fabricated in the same way as in Example 1, except that the positions of the first roll press section 130 and the second roll press section 140 were reversed.

Comparative Example 4

A laminated sheet was fabricated in the same way as in Example 1, except that quite no roll press was performed. That is, a manufacturing process was ended at the point of time at which the coating liquid on the aluminum foil being the current collector was dried.

[Evaluation]

First, how much porous grains fell off was evaluated in such a way that the front surface of each of the laminated sheets on the side of a polarizable electrode layer, the laminated sheets having been fabricated by the methods of Example 1 and Comparative examples 1–4, was rubbed with fingers.

Further, each laminated sheet was punched into a size of 20 mm×40 mm, and the punched sample was subjected to vacuum drying at temperatures of 150° C.–175° C. for at least 12 hours, whereby a water content adsorbed in the porous layer was removed to fabricate an electrode for an electrochemical capacitor. Besides, the volume capacitance of the electrode for the electrochemical capacitor as was thus fabricated was measured in the following way: First, two samples of each fabricated electrode for the electrochemical capacitor were prepared for an anode and for a cathode. Subsequently, the anode and the cathode were confronted to each other, and a separator made of unwoven fabric of regenerated cellulose (21 mm×41 mm, thickness: 0.05 mm, produced by Nippon Kodoshi Corporation, trade name: "TF4050") was arranged between the anode and the cathode, thereby to fabricate a lamination element in which the anode, the separator and the cathode were stacked in touched states (non-junction states) in the order mentioned. Besides, a measurement cell for the test evaluation was fabricated using the lamination element and an electrolyte solution (propylene carbonate solution of 1.2 mol/L of triethylmethyl ammonium borofluoride).

Subsequently, the fabricated measurement cell for the test evaluation was charged at a constant current of 2.5 mA by a charging-and-discharging test apparatus ("HJ-101SM6" produced by Hokuto Denko Corporation). A situation where a voltage rose as charges were accumulated in the electric double-layer capacitor was monitored, the constant-current charging was shifted to constant-voltage charging (relaxation charging) after the voltage reached 2.5 V, and the constant-voltage charging was ended when a current became 1/10 of the charging current. Besides, discharging was performed at the constant current of 2.5 mA, and a termination voltage was made zero V. After the test, charging was performed at a constant current of 5 mA, the constant-current charging was shifted to constant-voltage charging after a voltage reached 2.5 V, and the constant-voltage charging was ended when a current became 1/10 of the charging current. Besides, discharging was performed at the constant current of 5 mA, and a termination voltage was made zero V. With such constant-current/constant-voltage charging and discharging operations as one set, 10 sets of operations were repeatedly performed. Total discharge energy [W·s] was found as the temporal integral of discharge energy (discharge voltage×current(=5 mA)) from a discharge curve (discharge voltage–discharge time) thus obtained, a capacitance was found in conformity with the relation formula of capacitance [F]=2×total discharge energy [W·s]/(discharge initiation voltage $[V])^2$, and a value obtained by dividing the capacitance by the volume of both the electrodes (anode and cathode) was employed as a capacitance per unit volume (volume capacitance) $[F/cm^3]$. Incidentally, the measurement of the capacitance per unit volume was made under an environment of a temperature of 25° C. and a relative humidity of 60%.

The results of the evaluation are listed in Table 1.

TABLE 1

| | First roll press section | Second roll press section | Falling-off of Porous grains | Volume capacitance |
|---|---|---|---|---|
| Ex. 1 | Presence of Rugged pattern | Absence of Rugged pattern | ○ | 18 $F/cm^3$ |

TABLE 1-continued

|  | First roll press section | Second roll press section | Falling-off of Porous grains | Volume capacitance |
|---|---|---|---|---|
| Comp. ex. 1 | Presence of Rugged pattern | Presence of Rugged pattern | X | 18 F/cm$^3$ |
| Comp. ex. 2 | Absence of Rugged pattern | Absence of Rugged pattern | ○ | 16 F/cm$^3$ |
| Comp. ex. 3 | Absence of Rugged pattern | Presence of Rugged pattern | X | 18 F/cm$^3$ |
| Comp. ex. 4 | — | — | Δ | 13 F/cm$^3$ |

○ - Almost no falling-off,
Δ - Some falling-off, and
X - Much falling-off.

As indicated in Table 1, the laminated sheet fabricated by the method of Example 1 underwent almost no falling-off of the porous grains, and it attained a very high volume capacitance of 18 F/cm$^3$.

In contrast, the laminated sheets fabricated by the methods of Comparative examples 1 and 3, in each of which an embossments was not flattened, attained the high volume capacitance, but they underwent much falling-off of the porous grains. Besides, the laminated sheet fabricated by the method of Comparative example 2, in which no embossment work was performed, underwent almost no falling-off of the porous grains, but it did not attain a sufficient volume capacitance. Further, the laminated sheet fabricated by the method of Comparative example 4, in which no roll press was performed, exhibited a low volume capacitance and had the falling-off of the porous grains observed to some extent.

It has been verified from the above that the high volume capacitance is attained with the falling-off of the porous grains prevented, by performing the embossment work and thereafter flattening the embossment.

INDUSTRIAL APPLICABILITY

According to the present invention, it is permitted to provide a manufacturing method and a manufacturing apparatus for an electrode for an electrochemical capacitor having a high volume capacitance.

The invention claimed is:

1. An electrode for an electrochemical capacitor, comprising:
   a sheet-like current collector, and
   a polarizable electrode layer which is provided on said current collector with a predetermined bare portion left, said polarizable electrode layer having undergone an embossment work, at least part of the bare portion of said current collector not having undergone any embossment work,
   wherein a surface of said polarizable electrode layer having been embossed is flattened.

2. An electrode for an electrochemical capacitor as defined in claim 1, wherein substantially the whole surface of the bare portion of said current collector has not undergone any embossment work.

3. An electrode for an electrochemical capacitor as defined in claim 1, wherein porous grains having an electronic conductivity, and a binder capable of binding up the porous grains are contained in said polarizable electrode layer.

4. An electrode for an electrochemical capacitor as defined in claim 1, wherein an electrically conductive assistant is further contained in said polarizable electrode layer.

5. An electrode as claims in claim 1, wherein said surface of said polarizable electrode layer is flattened by a roller whose surface is substantially smooth is pressed against the surface of the polarizable electrode layer.

* * * * *

UNITED STATES PATENT AND TRADEMARK OFFICE
CERTIFICATE OF CORRECTION

PATENT NO.         : 7,173,806 B2                                            Page 1 of 1
APPLICATION NO.    : 11/016842
DATED              : February 6, 2007
INVENTOR(S)        : Hinoki et al.

It is certified that error appears in the above-identified patent and that said Letters Patent is hereby corrected as shown below:

On the title page, Item (75), the Inventors information is incorrect. Item (75) should read:

--(75)  Inventors: Kiyonori Hinoki, Tokyo (JP); Kazuo Katai, Tokyo (JP); Yousuke Miyaki, Tokyo (JP); Hideki Tanaka, Tokyo (JP) --

Signed and Sealed this

Tenth Day of April, 2007

JON W. DUDAS
*Director of the United States Patent and Trademark Office*